US011548270B2

(12) United States Patent
Hernandez et al.

(10) Patent No.: US 11,548,270 B2
(45) **Date of Patent: *Jan. 10, 2023**

(54) MULTILAYER POLYETHYLENE LAMINATES AND FILMS FOR USE IN FLEXIBLE PACKAGING MATERIALS

(71) Applicant: Dow Global Technologies LLC, Midland, MI (US)

(72) Inventors: Claudia Hernandez, Freeport, TX (US); Suzanne Guerra, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 285 days.

This patent is subject to a terminal disclaimer.

(21) Appl. No.: 16/625,134

(22) PCT Filed: Jun. 28, 2018

(86) PCT No.: PCT/US2018/039888

§ 371 (c)(1),
(2) Date: Dec. 20, 2019

(87) PCT Pub. No.: WO2019/006053

PCT Pub. Date: Jan. 3, 2019

(65) Prior Publication Data

US 2022/0024193 A1 Jan. 27, 2022

Related U.S. Application Data

(60) Provisional application No. 62/527,452, filed on Jun. 30, 2017.

(51) Int. Cl.
*B32B 27/32* (2006.01)
*B32B 27/08* (2006.01)
(Continued)

(52) U.S. Cl.
CPC .............. *B32B 27/32* (2013.01); *B32B 27/08* (2013.01); *B65D 65/40* (2013.01); *B65D 75/008* (2013.01);
(Continued)

(58) Field of Classification Search
CPC ..... B32B 27/32; B32B 27/08; B32B 2250/03; B32B 2250/05; B32B 2250/242;
(Continued)

(56) References Cited

U.S. PATENT DOCUMENTS 4,314,912 A 2/1982 Lowery et al.
4,339,507 A 7/1982 Kurtz et al.
(Continued)

FOREIGN PATENT DOCUMENTS

CN 106457793 A 2/2017
JP S6178644 A 4/1986
(Continued)

OTHER PUBLICATIONS

Randall, J.C., "Polymer Sequence Determination", Journal of Polymer Science, 1977, pp. 481.
(Continued)

*Primary Examiner* — Michael C Miggins
(74) *Attorney, Agent, or Firm* — Dinsmore & Shohl LLP

(57) ABSTRACT

Embodiments of multilayer films and laminate structures for flexible packaging comprise a multilayer polyolefin film comprising at least 3 layers. The multilayer polyolefin film comprises a first surface layer comprising: a first composition comprising at least one ethylene based polymer, wherein the first composition comprises a Molecular Weighted Comonomer Distribution Index (MWCDI) value greater than 0.9, and a melt index ratio ($I_{10}/I_2$) that meets the following equation: $I_{10}/I_2 \geq 7.0-1.2\times\log(I_2)$. The first surface layer also comprises a second composition comprising an
(Continued)

ethylene based polymer having a density from 0.890 to 0.925 g/cc and a melt index ($I_2$) from 0.2 to 2.0 g/10 min. The multilayer polyolefin film also comprises a first intermediate layer comprising the first composition.

14 Claims, 4 Drawing Sheets

(51) Int. Cl.
*B65D 65/40* (2006.01)
*B65D 75/00* (2006.01)

(52) U.S. Cl.
CPC ....... *B32B 2250/03* (2013.01); *B32B 2250/05* (2013.01); *B32B 2250/242* (2013.01); *B32B 2307/75* (2013.01); *B32B 2439/46* (2013.01); *B32B 2439/70* (2013.01)

(58) Field of Classification Search
CPC ............ B32B 2307/75; B32B 2439/46; B32B 2439/70; B65D 65/40; B65D 75/008
See application file for complete search history.

(56) References Cited

U.S. PATENT DOCUMENTS 4,547,475 A 10/1985 Glass et al.
4,612,300 A 9/1986 Coleman
5,064,802 A 11/1991 Stevens et al.
5,153,157 A 10/1992 Hlatky et al.
5,272,236 A 12/1993 Lai et al.
5,278,272 A 1/1994 Lai et al.
5,296,433 A 3/1994 Siedle et al.
5,321,106 A 6/1994 Lapointe
5,350,723 A 9/1994 Neithamer et al.
5,425,872 A 6/1995 Devore et al.
5,625,087 A 4/1997 Neithamer et al.
5,721,185 A 2/1998 Lapointe et al.
5,783,512 A 7/1998 Jacobsen et al.
5,883,204 A 3/1999 Spencer et al.
5,919,983 A 7/1999 Rosen et al.
5,977,251 A 11/1999 Kao et al.
6,103,657 A 8/2000 Murray
6,515,155 B1 2/2003 Klosin et al.
6,521,338 B1 2/2003 Maka
6,696,379 B1 2/2004 Carnahan et al.
6,812,289 B2 11/2004 Van Dun et al.
7,163,907 B1 1/2007 Ganich et al.

FOREIGN PATENT DOCUMENTS

WO 9308221 A2 4/1993
WO 2012003042 A1 1/2012
WO 2015200740 A2 12/2015
WO 2015200743 A1 12/2015
WO 2016083208 A1 6/2016
WO 2018063693 A1 4/2018

OTHER PUBLICATIONS

Randall et al., "UC NMR in Polymer Quantitative Anlyses" ACS Symposium Series 247, 1984, Chapter 9.

Busico et al., "1H NMR Analysis of Chain Unsaturations in Ethene/1-Octene Copolymers Prepared with Metallocene Catalysts at High Temperature", Macromolecules, 2005, 38, 6988.

Karjala et al., "Detection of Low Levels of Long-chain Branching in Polyolefins", Annual Technical Conference—Society of Plastics Engineers, 2008, 66th 887-891.

International Search Report and Written Opinion pertaining to PCT/US2018/039888, dated Sep. 19, 2018.

Bovey, F.A., "NMR and Macromolecules", ACS Symposium Series: NMR and Macromolecules by J.C. Randall, 1984.

Peacock, Andrew J., "Handbook of Polyethylene Structures, Properties, and Applications" Marcel Dekker Inc., 2000.

Brochure 100% PE Stand Up Pouch, Dow Chemical Company (published May 2012).

Datasheet ELITE 5690G (published 2016).

Brochure ExxonMobil HDPE HTA109 (published 2015).

Multilayer Flexible Packaging, First edition 2010, Elsevier Inc.

Presentation "Mono-Material Standbeutel ein echtes Kreislaufwirtschaftskonzept", public presentation given by Peter Niedersu? on Apr. 4 and 5, 2017 at SKZ Wurzburg, German.

Presentation „Novel Multilayer Packaging Solutions, public presentation given by Paulo Cavacas on Nov. 19, 2013.

Notice of Opposition to European Patent No. EP3645272 dated Feb. 15, 2022.

Decision of Final Rejection issued by the Chinese Patent Office for Chinese Patent Application No. 201880040728.3 dated Apr. 2, 2022 (7 total pages).

Japanese Office Action issued by the Japanese Patent Office for Japanese Patent Application No. 2019-570110 dated Jul. 5, 2022—translation (5 pages).

MULTILAYER POLYETHYLENE LAMINATES AND FILMS FOR USE IN FLEXIBLE PACKAGING MATERIALS

CROSS REFERENCE TO RELATED APPLICATION

This application is a National Stage Entry under 35 U.S.C. § 371 of International Patent Application No. PCT/US2018/039888 filed Jun. 28, 2018, which claims priority to U.S. Provisional Patent Application No. 62/527,452 filed Jun. 30, 2017, entitled MULTILAYER POLYETHYLENE LAMINATES AND FILMS FOR USE IN FLEXIBLE PACKAGING MATERIALS, the contents of which are hereby incorporated by reference in their entirety.

TECHNICAL FIELD

Embodiments described herein relate generally to multilayer films and laminates used in flexible packaging materials, and more particularly to polyethylene multilayer films and laminates used in flexible packaging materials.

BACKGROUND

Improved recyclability is a continual goal for flexible packaging manufacturers. To achieve this goal, films and laminates made with monomaterial polymers have been considered, because flexible packaging materials, such as standup pouches, when made from one polymer family, are more easily recyclable.

Conventional flexible packaging laminates include polymer substrates using multiple polymer families e.g., polyester (PET) as the print film and polyethylene (PE) for the sealant film. While monomaterial polyethylene (PE) flexible packaging materials are more beneficial from a recyclability standpoint, there are tradeoffs in terms of fabrication and processing speed. For example, conventional monomaterial PE standup pouches require lower pouch forming speeds than standup pouches containing PET, because of the lower thermal resistance of PE.

Accordingly, there is a need for monomaterial polyethylene multilayer films or laminates that achieve recyclability and increased thermal resistance and strength during fabrication.

SUMMARY

Embodiments of the present disclosure meet those needs and are directed to monomaterial polyethylene multilayer films and laminates comprising a combination of polyethylene resins that provide optics, stiffness, toughness, seal properties, and thermal resistance. Specifically, the present embodiments improve forming speeds of PE standup pouches by providing improved thermal resistance and strength (e.g., stiffness) during fabrication.

According to one embodiment of the present disclosure, a multilayer polyolefin film comprising at least 3 layers is provided. The multilayer polyolefin film comprises a first surface layer comprising: a first composition comprising at least one ethylene based polymer, wherein the first composition comprises a Molecular Weighted Comonomer Distribution Index (MWCDI) value greater than 0.9, and a melt index ratio ($I_{10}/I_2$) that meets the following equation: $I_{10}/I_2 \geq 7.0-1.2\times\log(I_2)$. The first surface layer also comprises a second composition comprising an ethylene based polymer having a density from 0.890 to 0.925 g/cc and a melt index ($I_2$) from 0.2 to 2.0 g/10 min. Additionally, the multilayer polyolefin film comprises a first intermediate layer comprising the first composition.

According to another multilayer polyolefin film embodiment, the multilayer polyolefin film comprises a first intermediate layer comprising the first composition, and the first surface layer comprises the second composition.

These and other embodiments are described in more detail in the following detailed description.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
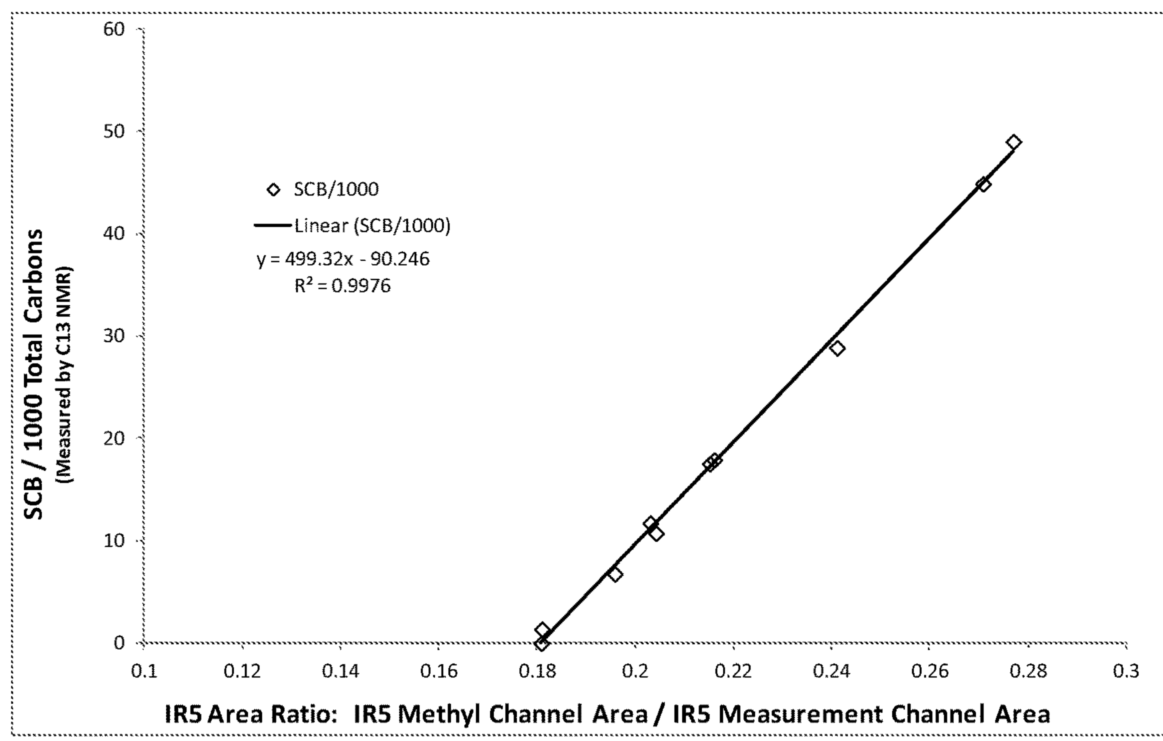
FIG. 1 depicts the plot of "$SCB_f$ versus IR5 Area Ratio" for ten SCB Standards.

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

The term "polymer" refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers. The term "interpolymer," as used herein, refers to a polymer prepared by the polymerization of at least two different types of monomers. The generic term "interpolymer" thus includes copolymers, and polymers prepared from more than two different types of monomers, such as terpolymers.

"Polyethylene" or "ethylene-based polymer" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "propylene-based polymer," as used herein, refers to a polymer that comprises, in polymerized form, a majority amount of propylene monomer (based on the total weight of the polymer) and optionally may comprise at least one polymerized comonomer.

The terms "flexible packaging" or "flexible packaging material" encompass various non-rigid containers familiar to the skilled person. These may include pouches, standup pouches, pillow pouches, bulk bags, pre-made packages or the like. Some typical end use applications for flexible packages are for snack, dry food, liquid, or cheese packages. Other end use applications include, but are not limited to, pet foods, snacks, chips, frozen foods, meats, hot dogs, and numerous other applications.

As used herein, the term, "monomaterial" means that the laminate structures are composed substantially of polyethylene, wherein "substantially" means at least 95 wt. % polyethylene, or at least 99 wt. % polyethylene, or at least 99.5 wt. % polyethylene, or at least 99.9 wt. % based on the overall weight of the laminate structure.

As used herein, the "print film", which may also be called the "front film", refers to an outer film of the laminate structure which is the film in which printing is performed in the production of flexible packages. The term "outer" is not to be construed as the outermost layer as many embodiments contemplate additional layers externally disposed on the print film, such as print primer layers, barrier layers, overprint varnish layers, or other layers known to the person skilled in the art of flexible packaging.

As used herein, "sealant film", which may also be called the "back film", refers to an inner film of the laminate structure disposed internally relative to the print film. The term "inner" is not to be construed as the innermost layer as some embodiments contemplate additional layers internally disposed on the sealant film, for example, barrier layer, etc.

As used herein, "surface layer" means an outer layer of the multilayer film. Further, "intermediate layer" may be any layer disposed internal to or between surface layers of the multilayer film.

As used herein, "laminate" means at least two distinct films, whether monolayer or multilayer, being adhered to one another. Conversely, as used herein, "monofilm" means a single multilayer film comprised of a plurality of coextruded layers.

Reference will now be made in detail to various embodiments of the present disclosure, specifically, multilayer films and laminate structures used in articles such as flexible packaging materials. In one or embodiments, the multilayer film is a multilayer polyolefin film comprising at least 3 layers. The discussion that follows centers on embodiments wherein the multilayer polyolefin film is a monomaterial polyethylene film; however, it is contemplated to utilize other materials such as propylene based polymers in one or more layers of the film. The multilayer polyolefin film may comprise a first surface layer, wherein the first surface layer comprises a first composition comprising at least one ethylene based polymer. The first composition comprises a Molecular Weighted Comonomer Distribution Index (MWCDI) value greater than 0.9, and a melt index ratio ($I_{10}/I_2$) that meets the following equation: $I_{10}/I_2 \geq 7.0-1.2\times\log(I_2)$. Additionally, the first surface layer further comprises a second composition, wherein the second composition comprises an ethylene based polymer having a density from 0.890 to 0.925 g/cc and a melt index ($I_2$) from 0.2 to 2.0 g/10 min. Moreover, the multilayer polyolefin film also comprises a first intermediate layer comprising the first composition.

In another embodiment, the multilayer polyolefin film According to another multilayer polyolefin film embodiment, the multilayer polyolefin film comprises a first intermediate layer comprising the first composition, and the first surface layer comprises the second composition.

Said another way, at least one of the first surface layer and the first intermediate layer each comprise the first composition. In further embodiments, additional layers, for example, an additional surface layer or one or more additional intermediate layers may also include the first composition. Moreover, for laminate embodiments, the first surface layer and the first intermediate layer of the sealant film includes the first composition; however, it is contemplated that the print film laminated to the sealant film may also include the first composition in one or more layers.

Various properties of the first composition impart improved thermal resistance and toughness to the multilayer polyolefin film. For example, the first composition has a superior comonomer distribution, which is significantly higher in comonomer concentration in the high molecular weight polymer molecules, and is significantly lower in comonomer concentration in the low molecular weight polymer molecules, as compared to conventional polymers of the art at the same overall density. It has also been discovered that the first composition has low LCB (Long Chain Branches), as indicated by low ZSVR, as compared to conventional polymers. As the result of this distribution of the comonomer, as well as the low LCB nature, the first composition has more tie chains, and thus improved film toughness.

The first composition includes an ethylene-based polymer, and in some embodiments, the first composition consists of the ethylene-based polymer. In alternative embodiments, the first composition includes the ethylene-based polymer blended with an additional polymer. For example, and not by way of limitation, this additional polymer is selected from an LLDPE, a VLDPE, an MDPE, an LDPE, an HDPE, an HMWHDPE (a high molecular weight HDPE), a propylene-based polymer, a polyolefin plastomer, a polyolefin elastomer, an olefin block copolymer, an ethylene vinyl acetate, an ethylene acrylic acid, an ethylene methacrylic acid, an ethylene methyl acrylate, an ethylene ethyl acrylate, an ethylene butyl acrylate, an isobutylene, a maleic anhydride-grafted polyolefin, an ionomer of any of the foregoing, or a combination thereof.

As discussed above, the first composition comprises a MWCDI value greater than 0.9. In one embodiment, the first composition has an MWCDI value less than, or equal to, 10.0, further less than, or equal to, 8.0, further less than, or equal to, 6.0. In another embodiment, the first composition has an MWCDI value less than, or equal to, 5.0, further less than, or equal to, 4.0, further less than, or equal to, 3.0. In yet another embodiment, the first composition has an MWCDI value greater than, or equal to, 1.0, further greater than, or equal to, 1.1, further greater than, or equal to, 1.2. In a further embodiment, the first composition has an MWCDI value greater than, or equal to, 1.3, further greater than, or equal to, 1.4, further greater than, or equal to, 1.5.

The first composition has a melt index ratio ($I_{10}/I_2$) that meets the following equation: $I_{10}/I_2 \geq 7.0-1.2\times\log(I_2)$. In yet another embodiment, the first composition has a melt index ratio $I_{10}/I_2$ greater than, or equal to, 7.0, further greater than, or equal to, 7.1, further greater than, or equal to, 7.2, further greater than, or equal to, 7.3. In one embodiment, the first composition has a melt index ratio $I_{10}/I_2$ less than, or equal to, 9.2, further less than, or equal to, 9.0, further less than, or equal to, 8.8, further less than, or equal to, 8.5.

In one embodiment, the first composition has a ZSVR value from 1.2 to 3.0, or from 1.2 to 2.5, or from 1.2 to 2.0.

In yet another embodiment, the first composition has a vinyl unsaturation level greater than 10 vinyls per 1,000,000 total carbons. For example, greater than 20 vinyls per 1,000,000 total carbons, or greater than 50 vinyls per 1,000,000 total carbons, or greater than 70 vinyls per 1,000,000 total carbons, or greater than 100 vinyls per 1,000,000 total carbons. Vinyl unsaturation is calculated using the nuclear magnetic resonance (NMR) spectroscopy defined below.

In one embodiment, the first composition has a density in the range of 0.900 g/cc to 0.960 g/$cm^3$, or from 0.910 to 0.940 g/$cm^3$, or from 0.910 to 0.930, or from 0.910 to 0.925 g/$cm^3$, or from 0.910 to 0.926 g/$cm^3$, or from 0.910 to 0.920 g/$cm^3$, or from 0.915 to 0.920 g/$cm^3$.

In a further embodiment, the first composition has a melt index ($I_2$; at 190° C./2.16 kg) from 0.1 to 50 g/10 minutes, for example from 0.1 to 30 g/10 minutes, or from 0.1 to 20 g/10 minutes, or from 0.1 to 10 g/10 minutes. For example, the melt index ($I_2$; at 190° C./2.16 kg) can be from a lower limit of 0.1, 0.2, or 0.5 g/10 minutes, to an upper limit of 1.0, 2.0, 3.0, 4.0, 5.0, 10, 15, 20, 25, 30, 40, or 50 g/10 minutes.

In another embodiment, the first composition has a molecular weight distribution, expressed as the ratio of the weight average molecular weight to number average molecular weight ($M_w/M_n$) as determined by conventional Gel Permeation Chromatography (GPC) (conv. GPC) in the range of from 2.2 to 5.0. For example, the molecular weight distribution ($M_w/M_n$) can be from a lower limit of 2.2, 2.3, 2.4, 2.5, 3.0, 3.2, or 3.4, to an upper limit of 3.9, 4.0, 4.1, 4.2, 4.5, or 5.0.

In one embodiment, the first composition has a number average molecular weight ($M_n$) as determined by conv. GPC in the range from 10,000 to 50,000 g/mole. For example, the number average molecular weight can be from a lower limit of 10,000, 20,000, or 25,000 g/mole, to an upper limit of 35,000, 40,000, 45,000, or 50,000 g/mole. In another embodiment, the ethylene-based polymer has a weight average molecular weight ($M_w$) as determined by conv. GPC in the range from 70,000 to 200,000 g/mole. For example, the number average molecular weight can be from a lower limit of 70,000, 75,000, or 78,000 g/mole, to an upper limit of 120,000, 140,000, 160,000, 180,000 or 200,000 g/mole.

In one embodiment, the first composition has a melt viscosity ratio, Eta*0.1/Eta*100, in the range from 2.2 to 7.0, wherein Eta*0.1 is the dynamic viscosity computed at a shear rate of 0.1 rad/s and Eta*100 is the dynamic viscosity computed at shear rate of 100 rad/s. Further details on the melt viscosity ratio and dynamic viscosity calculations are provided below.

In one embodiment, the ethylene-based polymer of the first composition is an ethylene/α-olefin interpolymer, and further an ethylene/α-olefin copolymer. The α-olefin may have less than, or equal to, 20 carbon atoms. For example, the α-olefin comonomers may have 3 to 10 carbon atoms, or from 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-butene, 1-hexene and 1-octene, and further 1-hexene and 1-octene.

The ethylene-based polymers may comprise less than 20 percent by weight of units derived from one or more α-olefin comonomers. All individual values and subranges from less than 18 weight percent are included herein and disclosed herein; for example, the ethylene-based polymers may comprise from less than 15 percent by weight of units derived from one or more α-olefin comonomers; or in the alternative, less than 10 percent by weight of units derived from one or more α-olefin comonomers; or in the alternative, from 1 to 20 percent by weight of units derived from one or more α-olefin comonomers; or in the alternative, from 1 to 10 percent by weight of units derived from one or more α-olefin comonomers.

Conversely, the ethylene-based polymers may comprise at least 80 percent by weight of units derived from ethylene. All individual values and subranges from at least 80 weight percent are included herein and disclosed herein; for example, the ethylene-based polymers may comprise at least 82 percent by weight of units derived from ethylene; or in the alternative, at least 85 percent by weight of units derived from ethylene; or in the alternative, at least 90 percent by weight of units derived from ethylene; or in the alternative, from 80 to 100 percent by weight of units derived from ethylene; or in the alternative, from 90 to 100 percent by weight of units derived from ethylene.

Optionally, the first composition further may comprise a second ethylene-based polymer. In a further embodiment, the second ethylene-based polymer is an ethylene/α-olefin interpolymer, and further an ethylene/α-olefin copolymer, or an LDPE. Suitable α-olefin comonomers are listed above.

In one embodiment, the second ethylene-based polymer is a heterogeneously branched ethylene/α-olefin interpolymer, and further a heterogeneously branched ethylene/α-olefin copolymer. Heterogeneously branched ethylene/α-olefin interpolymers and copolymers are typically produced using Ziegler/Natta type catalyst system, and have more comonomer distributed in the lower molecular weight molecules of the polymer.

In a further embodiment, the second ethylene-based polymer has a molecular weight distribution ($M_w/M_n$) in the range from 3.0 to 5.0, for example from 3.2 to 4.6. For example, the molecular weight distribution ($M_w/M_n$) can be from a lower limit of 3.2, 3.3, 3.5, 3.7, or 3.9, to an upper limit of 4.6, 4.7, 4.8, 4.9, or 5.0.

In yet another embodiment, the first composition further comprises another polymer. In a further embodiment, the polymer is selected from the following: a LLDPE, a MDPE, a LDPE, a HDPE, a propylene-based polymer, or a combination thereof.

In another embodiment, the composition further comprises a LDPE. In a further embodiment, the LDPE is present in an amount from 5 to 50 wt %, further from 10 to 40 wt %, further from 15 to 30 wt %, based on the weight of the composition. In a further embodiment, the LDPE has a density from 0.915 to 0.925 g/cc, and a melt index ($I_2$) from 0.5 to 5 g/10 min, further from 1.0 to 3.0 g/10 min.

In further embodiments, the first composition may comprise one or more additives. Additives include, but are not limited to, antistatic agents, color enhancers, dyes, lubricants, fillers (for example, $TiO_2$ or $CaCO_3$), opacifiers, nucleators, processing aids, pigments, primary anti-oxidants, secondary anti-oxidants, UV stabilizers, anti-block agents, slip agents, tackifiers, fire retardants, anti-microbial agents, odor reducer agents, anti-fungal agents, and combinations thereof.

To produce the ethylene based polymer of the first composition, suitable polymerization processes may include, but are not limited to, solution polymerization processes, using one or more conventional reactors, e.g., loop reactors, isothermal reactors, adiabatic reactors, stirred tank reactors, autoclave reactors in parallel, series, and/or any combinations thereof. The ethylene based polymer compositions may, for example, be produced via solution phase polymerization processes, using one or more loop reactors, adiabatic reactors, and combinations thereof.

In general, the solution phase polymerization process occurs in one or more well mixed reactors, such as one or more loop reactors and/or one or more adiabatic reactors at a temperature in the range from 115 to 250° C.; for example, from 135 to 200° C., and at pressures in the range of from 300 to 1000 psig, for example, from 450 to 750 psig.

In one embodiment, the ethylene based polymer of the first composition may be produced in two loop reactors in series configuration, the first reactor temperature is in the range from 115 to 200° C., for example, from 135 to 165° C., and the second reactor temperature is in the range from 150 to 210° C., for example, from 185 to 200° C. In another embodiment, the ethylene based polymer composition may be produced in a single reactor, the reactor temperature is in the range from 115 to 200° C., for example from 130 to 190° C. The residence time in a solution phase polymerization process is typically in the range from 2 to 40 minutes, for example from 5 to 20 minutes. Ethylene, solvent, one or more catalyst systems, optionally one or more cocatalysts, and optionally one or more comonomers, are fed continuously to one or more reactors. Exemplary solvents include, but are not limited to, isoparaffins. For example, such solvents are commercially available under the name ISOPAR E from ExxonMobil Chemical. The resultant mixture of the ethylene based polymer composition and solvent is then removed from the reactor or reactors, and the ethylene based polymer composition is isolated. Solvent is typically recovered via a solvent recovery unit, i.e., heat exchangers and separator vessel, and the solvent is then recycled back into the polymerization system.

In one embodiment, the ethylene based polymer of the first composition may be produced, via a solution polymerization process, in a dual reactor system, for example a dual loop reactor system, wherein ethylene, and optionally one or more α-olefins, are polymerized in the presence of one or more catalyst systems, in one reactor, to produce a first ethylene-based polymer, and ethylene, and optionally one or more α-olefins, are polymerized in the presence of one or more catalyst systems, in a second reactor, to produce a second ethylene-based polymer. Additionally, one or more cocatalysts may be present.

In another embodiment, the ethylene based polymer may be produced via a solution polymerization process, in a single reactor system, for example, a single loop reactor system, wherein ethylene, and optionally one or more α-olefins, are polymerized in the presence of one or more catalyst systems. Additionally, one or more cocatalysts may be present.

As discussed above, the disclosure provides a process to form a composition comprising at least two ethylene-based polymers, said process comprising the following: polymerizing ethylene, and optionally at least one comonomer, in solution, in the present of a catalyst system comprising a metal-ligand complex of Structure I, to form a first ethylene-based polymer; and polymerizing ethylene, and optionally at least one comonomer, in the presence of a catalyst system comprising a Ziegler/Natta catalyst, to form a second ethylene-based polymer; and wherein Structure I is as follows:

(I)

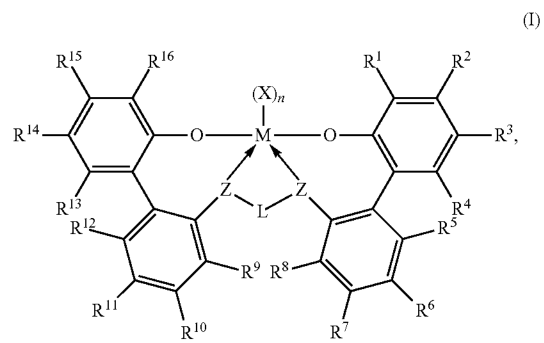

wherein:

M is titanium, zirconium, or hafnium, each, independently, being in a formal oxidation state of +2, +3, or +4; and n is an integer from 0 to 3, and wherein when n is 0, X is absent; and each X, independently, is a monodentate ligand that is neutral, monoanionic, or dianionic; or two Xs are taken together to form a bidentate ligand that is neutral, monoanionic, or dianionic; and X and n are chosen, in such a way, that the metal-ligand complex of formula (I) is, overall, neutral; and each Z, independently, is O, S, N$(C_1-C_{40})$hydrocarbyl, or P$(C_1-C_{40})$hydrocarbyl; and wherein the Z-L-Z fragment is comprised of formula (1):

(1)

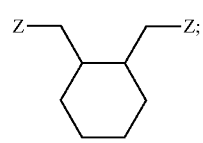

$R^1$ through $R^{16}$ are each, independently, selected from the group consisting of the following: a substituted or unsubstituted $(C_1-C_{40})$hydrocarbyl, a substituted or unsubstituted $(C_1-C_{40})$heterohydrocarbyl, $Si(R^C)_3$, $Ge(R^C)_3$, $P(R^P)_2$, $N(R^N)_2$, $OR^C$, $SR^C$, $NO_2$, CN, $CF_3$, $R^CS(O)$—, $R^CS(O)_2$—, $(R^C)_2C{=}N$—, $R^CC(O)O$—, $R^COC(O)$—, $R^CC(O)N(R)$—, $(R^C)_2NC(O)$—, halogen atom, hydrogen atom; and wherein each $R^C$ is independently a $(C_1-C_{30})$hydrocarbyl; $R^P$ is a $(C_1-C_{30})$hydrocarbyl; and $R^N$ is a $(C_1-C_{30})$hydrocarbyl; and wherein, optionally, two or more R groups (from $R^1$ through $R^{16}$) can combine together into one or more ring structures, with such ring structures each, independently, having from 3 to 50 atoms in the ring, excluding any hydrogen atom.

The process may comprise a combination of two or more embodiments as described herein. In one embodiment, the process comprises polymerizing ethylene, and optionally at least one α-olefin, in solution, in the presence of a catalyst system comprising a metal-ligand complex of Structure I, to form a first ethylene-based polymer; and polymerizing ethylene, and optionally at least one α-olefin, in the presence of a catalyst system comprising a Ziegler/Natta catalyst, to form a second ethylene-based polymer. In a further embodiment, each α-olefin is independently a $C_1$-$C_8$ α-olefin.

In one embodiment, optionally, two or more R groups from $R^9$ through $R^{13}$, or $R^4$ through $R^8$ can combine together into one or more ring structures, with such ring structures each, independently, having from 3 to 50 atoms in the ring, excluding any hydrogen atom.

In one embodiment, M is hafnium.

In one embodiment, $R^3$ and $R^{14}$ are each independently an alkyl, and further a $C_1$-$C_3$ alkyl, and further methyl.

In one embodiment, $R^1$ and $R^{16}$ are each as follows:

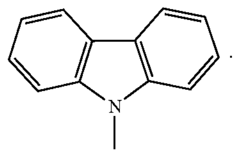

In one embodiment, each of the aryl, heteroaryl, hydrocarbyl, heterohydrocarbyl, $Si(R^C)_3$, $Ge(R^C)_3$, $P(R^P)_2$, $N(R^N)_2$, $OR^C$, $SR^C$, $R^CS(O)$—, $R^CS(O)_2$—, $(R^C)_2C{=}N$—, $R^CC(O)O$—, $R^COC(O)$—, $R^CC(O)N(R)$—, $(R^C)_2NC(O)$—, hydrocarbylene, and heterohydrocarbylene groups, independently, is unsubstituted or substituted with one or more $R^S$ substituents; and each $R^S$ independently is a halogen atom, polyfluoro substitution, perfluoro substitution, unsubstituted ($C_1$-$C_{18}$)alkyl, $F_3C$—, $FCH_2O$—, $F_2HCO$—, $F_3CO$—, $R_3Si$—, $R_3Ge$—, RO—, RS—, RS(O)—, $RS(O)_2$—, $R_2P$—, $R_2N$—, $R_2C{=}N$—, NC—, RC(O)O—, ROC(O)—, RC(O)N(R)—, or $R_2NC(O)$—, or two of the $R^S$ are taken together to form an unsubstituted ($C_1$-$C_{18}$)alkylene, wherein each R independently is an unsubstituted ($C_1$-$C_{18}$)alkyl.

In one embodiment, two or more of R1 through R16 do not combine to form one or more ring structures.

In one embodiment, the catalyst system suitable for producing the first ethylene/α-olefin interpolymer is a catalyst system comprising bis((2-oxoyl-3-(dibenzo-1H-pyrrole-1-yl)-5-(methyl)phenyl)-2-phenoxymethyl)-methylene-1,2-cyclohexanediylhafnium (IV) dimethyl, represented by the following Structure: IA:

(IA)

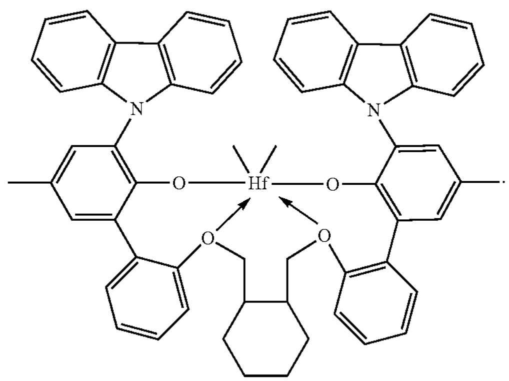

The Ziegler/Natta catalysts suitable for use in the invention are typical supported, Ziegler-type catalysts, which are particularly useful at the high polymerization temperatures of the solution process. Examples of such compositions are those derived from organomagnesium compounds, alkyl halides or aluminum halides or hydrogen chloride, and a transition metal compound. Examples of such catalysts are described in U.S. Pat. Nos. 4,612,300; 4,314,912; and 4,547,475; the teachings of which are incorporated herein by reference.

Particularly suitable organomagnesium compounds include, for example, hydrocarbon soluble dihydrocarbylmagnesium, such as the magnesium dialkyls and the magnesium diaryls. Exemplary suitable magnesium dialkyls include, particularly, n-butyl-sec-butylmagnesium, diisopropylmagnesium, di-n-hexylmagnesium, isopropyl-n-butylmagnesium, ethyl-n-hexyl-magnesium, ethyl-n-butylmagnesium, di-n-octylmagnesium, and others, wherein the alkyl has from 1 to 20 carbon atoms. Exemplary suitable magnesium diaryls include diphenylmagnesium, dibenzylmagnesium and ditolylmagnesium. Suitable organomagnesium compounds include alkyl and aryl magnesium alkoxides and aryloxides and aryl and alkyl magnesium halides, with the halogen-free organomagnesium compounds being more desirable.

Halide sources include active non-metallic halides, metallic halides, and hydrogen chloride. Suitable non-metallic halides are represented by the formula R'X, wherein R' is hydrogen or an active monovalent organic radical, and X is a halogen. Particularly suitable non-metallic halides include, for example, hydrogen halides and active organic halides, such as t-alkyl halides, allyl halides, benzyl halides and other active hydrocarbyl halides. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active, as defined hereinbefore, are also suitably employed. Examples of preferred active non-metallic halides, include hydrogen chloride, hydrogen bromide, t-butyl chloride, t-amyl bromide, allyl chloride, benzyl chloride, crotyl chloride, methylvinyl carbinyl chloride, a-phenylethyl bromide, diphenyl methyl chloride, and the like. Most preferred are hydrogen chloride, t-butyl chloride, allyl chloride and benzyl chloride.

Suitable metallic halides include those represented by the formula MRy-a Xa, wherein: M is a metal of Groups IIB, IIIA or IVA of Mendeleev's periodic Table of Elements; R is a monovalent organic radical; X is a halogen; y has a value corresponding to the valence of M; and "a" has a value from 1 to y. Preferred metallic halides are aluminum halides of the formula $AlR_{3-a}X_a$, wherein each R is independently hydrocarbyl, such as alkyl; X is a halogen; and a is a number from 1 to 3. Most preferred are alkylaluminum halides, such as ethylaluminum sesquichloride, diethylaluminum chloride, ethylaluminum dichloride, and diethylaluminum bromide, with ethylaluminum dichloride being especially preferred. Alternatively, a metal halide, such as aluminum trichloride, or a combination of aluminum trichloride with an alkyl aluminum halide, or a trialkyl aluminum compound may be suitably employed.

Any of the conventional Ziegler-Natta transition metal compounds can be usefully employed, as the transition metal component in preparing the supported catalyst component. Typically, the transition metal component is a compound of a Group IVB, VB, or VIB metal. The transition metal component is generally, represented by the formulas: $TrX'_{4-q}(OR1)q$, $TrX'_{4-q}(R2)q$, $VOX'_3$ and $VO(OR)_3$.

Tr is a Group IVB, VB, or VIB metal, preferably a Group IVB or VB metal, preferably titanium, vanadium or zirconium; q is 0 or a number equal to, or less than, 4; X' is a halogen, and R1 is an alkyl group, aryl group or cycloalkyl group having from 1 to 20 carbon atoms; and R2 is an alkyl group, aryl group, aralkyl group, substituted aralkyls, and the like.

The aryl, aralkyls, and substituted aralkys contain 1 to 20 carbon atoms, preferably 1 to 10 carbon atoms. When the transition metal compound contains a hydrocarbyl group, R2, being an alkyl, cycloalkyl, aryl, or aralkyl group, the hydrocarbyl group will preferably not contain an H atom in the position beta to the metal carbon bond. Illustrative, but non-limiting, examples of aralkyl groups are methyl, neopentyl, 2,2-dimethylbutyl, 2,2-dimethylhexyl; aryl groups such as benzyl; cycloalkyl groups such as 1-norbornyl. Mixtures of these transition metal compounds can be employed if desired.

Illustrative examples of the transition metal compounds include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$, and $Ti(OC_{12}H_{25})Cl_3$, $Ti(O\text{-}iC_3H_7)_4$, and $Ti(O\text{-}nC_4H_9)_4$. Illustrative examples of vanadium compounds include $VCl_4$, $VOCl_3$, $VO(OC_2H_5)_3$, and $VO(OC_4H_9)_3$. Illustrative examples of zirconium compounds include $ZrCl_4$, $ZrCl_3(OC_2H_5)$, $ZrCl_2(OC_2H_5)_2$, $ZrCl(OC_2H_5)_3$, $Zr(OC_2H_5)_4$, $ZrCl_3(OC_4H_9)$, $ZrCl_2(OC_4H_9)_2$, and $ZrCl(OC_4H_9)3$.

An inorganic oxide support may be used in the preparation of the catalyst, and the support may be any particulate oxide, or mixed oxide which has been thermally or chemically dehydrated, such that it is substantially free of adsorbed moisture. See U.S. Pat. Nos. 4,612,300; 4,314,912; and 4,547,475; the teachings of which are incorporated herein by reference.

The above described catalyst systems can be rendered catalytically active by contacting it to, or combining it with, the activating co-catalyst, or by using an activating technique, such as those known in the art, for use with metal-based olefin polymerization reactions. Suitable activating co-catalysts, for use herein, include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, U.S. Pat. No. 6,103,657. Examples of preferred polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(hydrocarbyl)-substituted-aluminum or tri(hydrocarbyl)-boron compounds are tri(($C_1$-$C_{10}$) alkyl)aluminum or tri(($C_6$-$C_{18}$)aryl)boron compounds and halogenated (including perhalogenated) derivatives thereof. In some other embodiments, exemplary Group 13 metal compounds are tris(fluoro-substituted phenyl)boranes, in other embodiments, tris(pentafluorophenyl)borane. In some embodiments, the activating co-catalyst is a tris(($C_1$-$C_{20}$) hydrocarbyl) borate (e.g., trityl tetrafluoroborate) or a tri (($C_1$-$C_{20}$)hydrocarbyl)ammonium tetra(($C_1$-$C_{20}$)hydrocarbyl)borane (e.g., bis(octadecyl)methylammonium tetrakis (pentafluorophenyl)borane). As used herein, the term "ammonium" means a nitrogen cation that is a (($C_1$-$C_{20}$) hydrocarbyl)$_4N^+$, a (($C_1$-$C_{20}$)hydrocarbyl)$_3N(H)^+$, a (($C_1$-$C_{20}$)hydrocarbyl)$_2N(H)_2^+$, ($C_1$-$C_{20}$)hydrocarbyl$N(H)_3^+$, or $N(H)_4^+$, wherein each ($C_1$-$C_{20}$)hydrocarbyl may be the same or different.

Exemplary combinations of neutral Lewis acid activating co-catalysts include mixtures comprising a combination of a tri(($C_1$-$C_4$)alkyl)aluminum and a halogenated tri(($C_6$-$C_{18}$) aryl)boron compound, especially a tris(pentafluorophenyl) borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex): (tris(pentafluoro-phenylborane): (alumoxane) [e.g., (Group 4 metal-ligand complex):(tris(pentafluoro-phenylborane): (alumoxane)] are from 1:1:1 to 1:10:30, other exemplary embodiments are from 1:1:1.5 to 1:5:10.

Many activating co-catalysts and activating techniques have been previously taught, with respect to different metal-ligand complexes, in the following USPNs: U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion, as activating co-catalysts for addition polymerization catalysts, are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts, as activating co-catalysts for addition polymerization catalysts, are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1, beginning at column 50, at line 39, and going through column 56, at line 55, only the portion of which is incorporated by reference herein.

In some embodiments, the above described catalyst systems can be activated to form an active catalyst composition by combination with one or more cocatalyst, such as a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to, modified methyl aluminoxane (MMAO), bis(hydrogenated tallow alkyl)methyl, tetrakis(pentafluorophenyl)borate(1-) amine, triethyl aluminum (TEA), and any combinations thereof.

In some embodiments, one or more of the foregoing activating co-catalysts are used in combination with each other. In one embodiment, a combination of a mixture of a tri(($C_1$-$C_4$)hydrocarbyl)aluminum, tri(($C_1$-$C_4$)hydrocarbyl) borane, or an ammonium borate with an oligomeric or polymeric alumoxane compound, can be used.

As noted above, in addition to the first composition, the first surface layer also comprises a second composition comprising an ethylene-based polymer having a density from 0.890 to 0.925 g/cc and a melt index ($I_2$) from 0.2 to 2 g/10 min. In one or more embodiments, the second composition comprises an ethylene interpolymer, or specifically and ethylene/α-olefin copolymer, wherein the α-olefin comonomer may have 3 to 10 carbon atoms, or from 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The ethylene-based polymers may comprise less than 20 percent by weight of units derived from one or more α-olefin comonomers.

Various mechanisms for producing the second composition are contemplated. For example, the second composition may be produced from the polymerization of ethylene and one or more α-olefin comonomers in the presence of one or more catalysts, such as a Ziegler-Natta catalyst, a Phillips catalyst, a metallocene catalyst, a post-metallocene catalyst, a constrained geometry complex (CGC) catalyst, or a biphenyl phenol (BPP) complex catalyst. In one embodiment, the second composition is produced from one or more CGC catalysts, such as disclosed in U.S. Pat. Nos. 5,272,236, 5,278,272, 6,812,289, and WO 93/08221, which are incorporated herein by reference. In further embodiments, the second composition may include antiblock additives, slip additives, or both.

In further embodiments, the second composition of the first surface layer may have a density from 0.900 to 0.925 g/cc, or from 0.900 to 0.910 g/cc. In other embodiments, the second composition may have a melt index ($I_2$) from 0.5 to 2 g/10 min, or from 0.8 to 1.2 g/10 min. In one or more embodiments, the second composition is a polyolefin plastomer, a linear low density polyethylene (LLDPE) polymer, or combinations thereof. Various commercial products are considered suitable for the second composition, such as AFFINITY™ PL 1881G, a polyolefin plastomer which is available from The Dow Chemical Company (Midland, Mich.). Without being bound by theory, polyolefin plastomers are especially suitable in the sealant layer of a laminate sealant film.

Various amounts are also contemplated for the combination of the first composition and the second composition in the first surface layer. In one or more embodiments, the first surface layer comprises from 30 to 90 wt. %, or from 50 to 85 wt. %, or from 50 to 70 wt. %, or from 70 to 90 wt. % of the first composition. Additionally, the first surface layer comprises from 10 to 70 wt. %, or from 15 to 50 wt. %, or from 10 to 20 wt. %, or from 30 to 50 wt. % of the second composition.

Moreover, the multilayer polyolefin film also comprises a first intermediate layer having the first composition. In addition to the first composition, the first intermediate layer may comprise other ethylene-based polymers.

Various amounts are also contemplated for the first composition in the first intermediate layer. In one or more embodiments, the first intermediate layer may comprise at least 40% by wt. of the first composition, or at least 50% by wt. Moreover, the first intermediate layer may comprise from 50 to 95% by wt., or from 60 to 95% by wt., or from 55 to 90% by wt., or from 55 to 70% by wt., or from 80 to 90% by wt. of the first composition. In embodiments including LDPE, the first intermediate layer may comprise from 5 to 40% by wt., or from 5 to 20% by wt., or from 10 to 20% by wt., of LDPE.

In laminate embodiments, the first intermediate layer further comprises a high density polyethylene (HDPE) in combination with the first composition. The HDPE has a density from 0.950 to 0.965 g/cc and a melt index ($I_2$) from 0.1 to 1.3 g/10 min. In further embodiments, the HDPE may have a density from 0.955 to 0.965 g/cc, or from 0.960 to 0.965 g/cc. In a further embodiment, the melt index ($I_2$) may be from 0.5 to 1.0 g/10 min.

Various methodologies are contemplated for producing the HDPE, a polyethylene copolymer produced from the polymerization of ethylene and one or more α-olefin comonomers in the presence of one or more catalysts, such as a Ziegler-Natta catalyst, a Phillips catalyst, a metallocene catalyst, a post-metallocene catalyst, a CGC catalyst, or a BPP complex catalyst. In a specific embodiment, the HDPE may be produced from metallocene catalysts. The α-olefin comonomers may include $C_3$-$C_{12}$ olefin monomers. In one embodiment, the α-olefin comonomer in the HDPE is 1-octene. Various commercial HDPE products are considered suitable, for example, ELITE™ 5960G from The Dow Chemical Company (Midland, Mich.).

Additional resins or additives are contemplated for the first intermediate layer. For example, the first intermediate layer may include antiblock agent, slip agent, or both. Various amounts of HDPE are contemplated within the first intermediate layer. For example, the first intermediate layer may comprise from 40 to 80 wt % of the first composition, and from 20 to 60 wt % of the HDPE.

Figure 5:
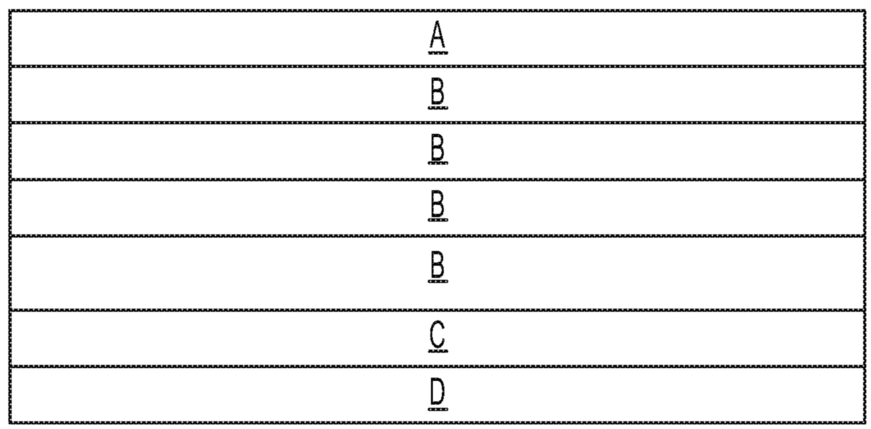
FIG. 5 is a schematic view of a multilayer film according to one or more embodiments of the present disclosure.

The present multilayer polyolefin films may be utilized in monofilms and laminates. For example, the multilayer polyolefin film may be part of a monofilm comprising at least 3 layers. As a would be familiar to the skilled person, films having greater than 3 layers, such as a 5-layer film or the 7-layer film of FIG. 5 is considered suitable. As shown in FIG. 5, the 7-layer multilayer polyolefin film 10 includes a first surface layer A, a first intermediate layer C, 4 second intermediate layers B, and a second surface layer D.

Moreover, the multilayer polyolefin film may also comprise a second intermediate layer comprising HDPE having the above described density ranges and melt index ($I_2$) ranges. In one or more embodiments, the second intermediate layer may comprise at least 95% by wt. HDPE, or at least 99% by wt. HDPE, or 100% by wt. HDPE. While the 7-layer structure of FIG. 5 depicts multiple second intermediate layers, it is contemplated that there may be only a single second intermediate layer in further embodiments.

Additionally as shown in FIG. 5, the multilayer polyolefin film may comprise a second surface layer D. The second surface layer D may comprise a linear low density polyethylene (LLDPE) having a density from 0.880 to 0.920 g/cc and a melt index ($I_2$) from 0.1 to 5 g/10 min. In other embodiments, the LLDPE of the second surface layer D may have a density from 0.890 to 0.910 g/cc. Moreover, the melt index ($I_2$) of the LLDPE may be from 0.5 to 2 g/10 min, or from 0.75 to 1.5 g/10 min.

In additional embodiment, the multilayer polyolefin film may comprise LDPE having a density from 0.915 to 0.930 g/cc, or from 0.915 g/cc to 0.925 g/cc. Moreover, the melt index ($I_2$) of the LDPE may be from 1.0 to 5.0 g/10 min, or from 1.0 to 3.0 g/10 min, or from 1.5 to 2.5 g/10 min, or from or from 1.5 to 2.0 g/10 min. Moreover, the LDPE may have a Molecular Weight Distribution (MWD) from 3 to 10. Various commercial LDPE products are considered suitable, for example, AGILITY™ 1021, which is available from The Dow Chemical Company (Midland, Mich.).

Like the HDPE, various methodologies are contemplated for producing the LLDPE. LLDPE is a polyethylene copolymer produced from the polymerization of ethylene and one or more α-olefin comonomers in the presence of one or more catalysts, such as a Ziegler-Natta catalyst, a metallocene catalyst, a post-metallocene catalyst, or a CGC catalyst.

Various commercial LLDPE products are considered suitable, such as AFFINITY™ PF 1146G, which is commercially available from The Dow Chemical Company (Midland, Mich.).

In addition to the components of the monofilms described above, other polymeric additives may be included, such as, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. In specific embodiments, slip agents, anti-blocking agents, or both may be included.

Figure 6:
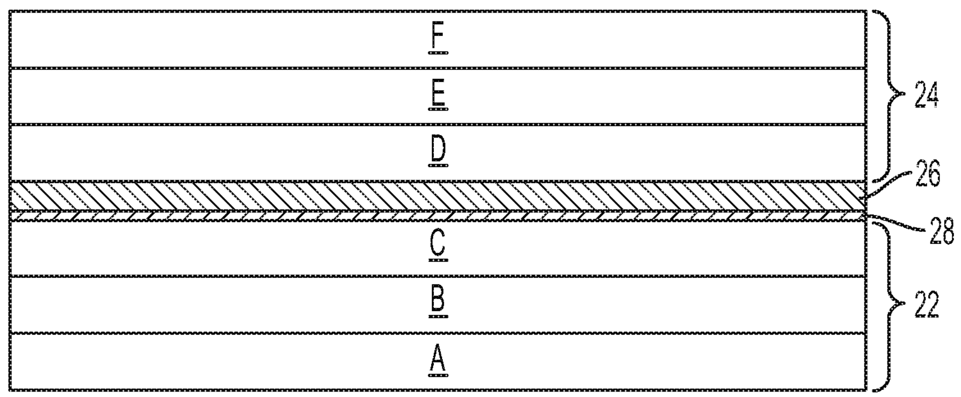
FIG. 6 is a schematic view of a laminate according to one embodiments of the present disclosure.

Referring to FIG. 6, a laminate 20, which includes the multilayer polyolefin film, is shown. In the laminate 20 embodiment of FIG. 6, the multilayer polyolefin film 22 is the sealant film, and the second multilayer polyolefin film 24 laminated to the multilayer polyolefin film 22 is the print film. The multilayer polyolefin film 22 and the second multilayer polyolefin film 24 are each 3-layer structures; however, it is contemplated that the number of layers for each film may vary.

As shown in FIG. 6, the first surface layer A, which includes the first composition and the second composition, is the sealant layer of the sealant film. The first intermediate layer C, which also includes the first composition, contacts the adhesive 28 used in the laminate 22. As described above, the first intermediate layer C may also include HDPE. Optionally, the first surface layer A and the first intermediate layer C may include antiblock additives, slip additives, or both. Further as shown, the sealant film 22 may also comprise a second intermediate layer B comprising HDPE and optionally antiblock additives, slip additives, pigments such as $TiO_2$, and combinations thereof.

Referring again to FIG. 6, the second multilayer polyolefin film 24 is the print film of the laminate in one or more embodiments. Various ethylene-based polymers are contemplated. For example, the print film 24 may comprise HDPE in one or more layers. In one embodiment, HDPE is included in intermediate layer E for increased stiffening in the laminate 20. Additionally, the print film 24 may comprise the first composition in one or more layers. In one embodiment, the first composition may be present in layer D, which is the print layer of the print film 24 and thus contacts the ink 26 which is printed thereon. Further, the print film 24 may include a surface layer F, which includes LLDPE. Suitable examples may include DOWLEX™ 5075G, which is commercially available from The Dow Chemical Company (Midland, Mich.).

In addition to the components of the monofilms described above, other polymeric additives may be included, such as, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. In specific embodiments, slip agents, anti-blocking agents, or both may be included with one or more of the polymers of the print film and/or the sealant film.

Optionally, the layers of the print film may include antiblock additives, slip additives, or both.

Various thicknesses are considered suitable for the laminates 20. For example, the sealant film 22 may have an overall thickness of 30 to 125 μm. The sealant film 22 may be defined by a ratio by layer thickness for layers A, B, and C, respectively. Various ratios are contemplated, for example, from 1:1:1 to 1:5:1, or 1:3:1. The print film 24 may have an overall thickness of 20 to 60 μm. The print film 24 may be defined by a ratio by layer thickness for layers D, E and F, respectively. Various ratios are contemplated, for example, from 1:1:1 to 1:5:1.

Methods for Producing the Films, Laminates, and Flexible Packages

Various methodologies are contemplated for producing the print films, and the sealant films. For example, the multilayer print films may prepared by cast film extrusion, or blown film extrusion. Similarly, multilayer sealant films may also be prepared by cast film extrusion, or blown film extrusion.

The multilayer blown films described herein can be made by a variety of techniques. For example, methods of making multilayer blown films are described in U.S. Pat. No. 6,521,338 (Maka), the entirety of which patent is incorporated herein by reference. For example, in some embodiments, a multilayer blown film can be made by co-extruding an inner layer composition with the first outer layer composition and the second outer layer composition in an extruder to form a tube having an inner layer, a first outer layer, and a second outer layer, and cooling the tube to form a multilayer blown film.

In embodiments described herein, the multilayer blown film may have a thickness of 0.3 to 5 mils. For example, the multilayer blown film can have a thickness from a lower limit of 0.3 mils, 0.5 mils, 0.7 mils, 1.0 mil, 1.75 mils, and 2.0 mils to an upper limit of 3.0 mils, 4.0 mils, or 5.0 mils.

After the print film has been blown or cast, the print film may undergo a printing process. Various printing processes are considered suitable for the cast or blown print films. These printing processes may include, but are not limited to rotogravure printing, flexographic printing, and offset printing.

Various methodologies familiar to the person skilled in the art are also considered suitable for laminating the print film and the sealant film to produce the present laminate structures.

Laminated film can be prepared either by extrusion coating/lamination or adhesive lamination. Extrusion coating or lamination is a technique for producing packaging materials. Similar to cast film, extrusion coating is a flat die technique. A film can be extrusion coated onto a substrate either in the form of a monolayer or a coextruded extrudate according to, for example, the processes described in U.S. Pat. No. 4,339,507. Utilizing multiple extruders or by passing the various substrates through the extrusion coating system several times can result in multiple polymer layers each providing some sort of performance attribute whether it be barrier, toughness, or improved hot tack or heat sealability.

The following is illustrative of a procedure for forming an adhesive lamination. A known thickness (48 micron for instance) exterior film (lamination substrate) goes through a coating deck where a solvent-based (or solventless) or water-based adhesive is applied at 20-50% solids at a coat weight of about 0.5-3 pounds per ream. After the adhesive is applied, the web travels through an oven for drying (if necessary), then moves to a laminator comprising at least a heated steel roll and a rubber roll (other configurations may also exists). The back side of the coated exterior film makes contact with the hot steel roll. In the meantime the interior film is corona treated to about 38-42 dyne. The corona treated side of the film comes into contact with the adhesive side of the exterior substrate as it enters between the rubber roll and heated steel roll and the two substrates are combined. The resulting laminate structure is wound on a rewind system thus forming the final laminate.

Alternatively, various additional processes may be used to produce flexible packages from the laminate structures.

These may include heat sealing or other processes familiar to the person skilled in the art.

Testing Methods

The test methods include the following:

Melt Index ($I_2$)

Melt index ($I_2$) was measured in accordance to ASTM D-1238 at 190° C. at 2.16 kg. Melt index ($I_{10}$) was measured in accordance to ASTM D-1238 at 190° C. at 10 kg. The values are reported in g/10 min, which corresponds to grams eluted per 10 minutes.

Density

Samples for density measurement were prepared according to ASTM D4703 and reported in grams/cubic centimeter (g/cc or g/cm$^3$). Measurements were made within one hour of sample pressing using ASTM D792, Method B.

Seal Strength

The force required to pull a seal apart is called "seal strength" (also known as "heat seal strength"). Seal strength is measured in accordance with ASTM F88-94. The seal strength is measured at ambient conditions.

Peak Melting Point

Peak melting point is determined by a Differential Scanning Calorimeter (DSC) where the film is conditioned at 230° C. for 3 minutes prior to cooling at a rate of 10° C. per minute to a temperature of −40° C. After the film is kept at −40° C. for 3 minutes, the film is heated to 200° C. at a rate of 10° C. per minute.

Dynamic Shear Rheology

Each sample was compression-molded into "3 mm thick×25 mm diameter" circular plaque, at 177° C., for five minutes, under 10 MPa pressure, in air. The sample was then taken out of the press and placed on a counter top to cool.

Constant temperature, frequency sweep measurements were performed on an ARES strain controlled rheometer (TA Instruments), equipped with 25 mm parallel plates, under a nitrogen purge. For each measurement, the rheometer was thermally equilibrated, for at least 30 minutes, prior to zeroing the gap. The sample disk was placed on the plate, and allowed to melt for five minutes at 190° C. The plates were then closed to 2 mm, the sample trimmed, and then the test was started. The method had an additional five minute delay built in, to allow for temperature equilibrium. The experiments were performed at 190° C., over a frequency range from 0.1 to 100 rad/s, at five points per decade interval. The strain amplitude was constant at 10%. The stress response was analyzed in terms of amplitude and phase, from which the storage modulus (G'), loss modulus (G"), complex modulus (G*), dynamic viscosity (η* or Eta*), and tan δ (or tan delta) were calculated.

Conventional Gel Permeation Chromatography (Conv. GPC)

A GPC-IR high temperature chromatographic system from PolymerChar (Valencia, Spain), was equipped with a Precision Detectors (Amherst, Mass.), 2-angle laser light scattering detector Model 2040, an IR5 infra-red detector and a 4-capillary viscometer, both from PolymerChar. Data collection was performed using PolymerChar Instrument Control software and data collection interface. The system was equipped with an on-line, solvent degas device and pumping system from Agilent Technologies (Santa Clara, Calif.).

Injection temperature was controlled at 150 degrees Celsius. The columns used, were three, 10-micron "Mixed-B" columns from Polymer Laboratories (Shropshire, UK). The solvent used was 1,2,4-trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently at 160 degrees Celsius for three hours. The injection volume was "200 microliters,' and the flow rate was "1 milliliters/minute." The GPC column set was calibrated by running 21 "narrow molecular weight distribution" polystyrene standards. The molecular weight (MW) of the standards ranges from 580 to 8,400,000 g/mole, and the standards were contained in six "cocktail" mixtures. Each standard mixture had at least a decade of separation between individual molecular weights. The standard mixtures were purchased from Polymer Laboratories. The polystyrene standards were prepared at "0.025 g in 50 mL of solvent" for molecular weights equal to, or greater than, 1,000,000 g/mole, and at "0.050 g in 50 mL of solvent" for molecular weights less than 1,000,000 g/mole.

The polystyrene standards were dissolved at 80° C., with gentle agitation, for 30 minutes. The narrow standards mixtures were run first, and in order of decreasing "highest molecular weight component," to minimize degradation. The polystyrene standard peak molecular weights were converted to polyethylene molecular weight using Equation 1 (as described in Williams and Ward, J. Polym. Sci., Polym. Letters, 6, 621 (1968)):

$$\text{Mpolyethylene}=A\times(\text{Mpolystyrene})^B \quad \text{(Eqn. 1)},$$

where M is the molecular weight, A is equal to 0.4316 and B is equal to 1.0.

Number-average molecular weight (Mn(conv gpc)), weight average molecular weight (Mw-conv gpc), and z-average molecular weight (Mz(conv gpc)) were calculated according to Equations 2-4 below.

$$Mn(conv\ gpc) = \frac{\sum_{i=RV_{integration\ start}}^{i=RV_{integration\ end}} (IR_{measurement\ channel_i})}{\sum_{i=RV_{integration\ start}}^{i=RV_{integration\ end}} (IR_{measurement\ channel_i}/M_{PE_i})} \quad \text{(Eqn. 2)}$$

$$Mw(conv\ gpc) = \frac{\sum_{i=RV_{integration\ start}}^{i=RV_{integration\ end}} (M_{PE_i}\ IR_{measurement\ channel_i})}{\sum_{i=RV_{integration\ start}}^{i=RV_{integration\ end}} (IR_{measurement\ channel_i})} \quad \text{(Eqn. 3)}$$

$$Mz(conv\ gpc) = \frac{\sum_{i=RV_{integration\ start}}^{i=RV_{integration\ end}} (M_{PE_i}^2\ IR_{measurement\ channel_i})}{\sum_{i=RV_{integration\ start}}^{i=RV_{integration\ end}} (M_{PE_i}\ IR_{measurement\ channel_i})} \quad \text{(Eqn. 4)}$$

In Equations 2-4, the RV is column retention volume (linearly-spaced), collected at "1 point per second," the IR is the baseline-subtracted IR detector signal, in Volts, from the IR5 measurement channel of the GPC instrument, and $M_{PE}$ is the polyethylene-equivalent MW determined from Equation 1. Data calculations were performed using "GPC One software (version 2.013H)" from PolymerChar.

Creep Zero Shear Viscosity Measurement Method

Zero-shear viscosities were obtained via creep tests, which were conducted on an AR G2 stress controlled rheometer (TA Instruments; New Castle, Del.), using "25-mm-diameter" parallel plates, at 190° C. The rheometer oven was set to test temperature for at least 30 minutes, prior to zeroing the fixtures. At the testing temperature, a compression molded sample disk was inserted between the plates, and allowed to come to equilibrium for five minutes. The upper plate was then lowered down to 50 μm (instrument setting) above the desired testing gap (1.5 mm). Any superfluous material was trimmed off, and the upper plate was lowered to the desired gap. Measurements were done under nitrogen purging, at a flow rate of 5 L/min. The default creep time was set for two hours. Each sample was compression-molded into a "2 mm thick×25 mm diameter" circular plaque, at 177° C., for five minutes, under 10 MPa pressure, in air. The sample was then taken out of the press and placed on a counter top to cool.

A constant low shear stress of 20 Pa was applied for all of the samples, to ensure that the steady state shear rate was low enough to be in the Newtonian region. The resulting steady state shear rates were in the range from $10^{-3}$ to $10^{-4}$ $s^{-1}$ for the samples in this study. Steady state was determined by taking a linear regression for all the data, in the last 10% time window of the plot of "log (J(t)) vs. log(t)," where J(t) was creep compliance and t was creep time. If the slope of the linear regression was greater than 0.97, steady state was considered to be reached, then the creep test was stopped. In all cases in this study, the slope meets the criterion within one hour. The steady state shear rate was determined from the slope of the linear regression of all of the data points, in the last 10% time window of the plot of "c vs. t," where £ was strain. The zero-shear viscosity was determined from the ratio of the applied stress to the steady state shear rate.

In order to determine if the sample was degraded during the creep test, a small amplitude oscillatory shear test was conducted before, and after, the creep test, on the same specimen from 0.1 to 100 rad/s. The complex viscosity values of the two tests were compared. If the difference of the viscosity values, at 0.1 rad/s, was greater than 5%, the sample was considered to have degraded during the creep test, and the result was discarded.

Zero-Shear Viscosity Ratio (ZSVR) is defined as the ratio of the zero-shear viscosity (ZSV) of the branched polyethylene material to the ZSV of a linear polyethylene material (see ANTEC proceeding below) at the equivalent weight average molecular weight (Mw(conv gpc)), according to the following Equation 5:

$$ZSVR = \frac{\eta_{0B}}{\eta_{0L}} = \frac{\eta_{0B}}{2.29^{-15} M_{w(conv\text{-}gpc)}^{3.65}}. \quad \text{(Eqn. 5)}$$

The ZSVR value was obtained from creep test, at 190° C., via the method described above. The Mw(conv gpc) value was determined by the conventional GPC method (Equation 3), as discussed above. The correlation between ZSV of linear polyethylene and its Mw(conv gpc) was established based on a series of linear polyethylene reference materials. A description for the ZSV-Mw relationship can be found in the ANTEC proceeding: Karjala et al., *Detection of Low Levels of Long-chain Branching in Polyolefins*, Annual Technical Conference—Society of Plastics Engineers (2008), 66th 887-891.

$^1$H NMR Method

A stock solution (3.26 g) was added to "0.133 g of the polymer sample" in 10 mm NMR tube. The stock solution was a mixture of tetrachloroethane-$d_2$ (TCE) and perchloroethylene (50:50, w:w) with 0.001M $Cr^{3+}$. The solution in the tube was purged with $N_2$, for 5 minutes, to reduce the amount of oxygen. The capped sample tube was left at room temperature, overnight, to swell the polymer sample. The sample was dissolved at 110° C. with periodic vortex mixing. The samples were free of the additives that may contribute to unsaturation, for example, slip agents such as erucamide. Each $^1$H NMR analysis was run with a 10 mm cryoprobe, at 120° C., on Bruker AVANCE 400 MHz spectrometer.

Two experiments were run to get the unsaturation: the control and the double presaturation experiments. For the control experiment, the data was processed with an exponential window function with LB=1 Hz, and the baseline was corrected from 7 to −2 ppm. The signal from residual $^1$H of TCE was set to 100, and the integral $I_{total}$ from −0.5 to 3 ppm was used as the signal from whole polymer in the control experiment. The "number of $CH_2$ group, $NCH_2$," in the polymer was calculated as follows in Equation 1A:

$$NCH_2 = I_{total}/2 \quad \text{(Eqn. 1A).}$$

For the double presaturation experiment, the data was processed with an exponential window function with LB=1 Hz, and the baseline was corrected from about 6.6 to 4.5 ppm. The signal from residual $^1$H of TCE was set to 100, and the corresponding integrals for unsaturations ($I_{vinylene}$, $I_{trisubstituted}$, and $I_{vinylidene}$) were integrated. It is well known to use NMR spectroscopic methods for determining polyethylene unsaturation, for example, see Busico, V., et al., *Macromolecules*, 2005, 38, 6988. The number of unsaturation unit for vinylene, trisubstituted, vinyl and vinylidene were calculated as follows:

$$N_{vinylidene} = I_{vinylidene}/2 \quad \text{(Eqn. 2A),}$$

$$N_{trisubstituted} = I_{trisubstitute} \quad \text{(Eqn. 3A),}$$

$$N_{vinyl} = I_{vinyl}/2 \quad \text{(Eqn. 4A),}$$

$$N_{vinylidene} = I_{vinylidene}/2 \quad \text{(Eqn. 5A).}$$

The unsaturation units per 1,000 carbons, all polymer carbons including backbone carbons and branch carbons, were calculated as follows:

$$N_{vinylene}/1{,}000\ C = (N_{vinylene}/NCH_2)*1{,}000 \quad \text{(Eqn. 6A),}$$

$$N_{trisubstituted}/1{,}000\ C = (N_{trisubstituted}/NCH_2)*1{,}000 \quad \text{(Eqn. 7A),}$$

$$N_{vinyl}/1{,}000\ C = (N_{vinyl}/NCH_2)*1{,}000 \quad \text{(Eqn. 8A),}$$

$$N_{vinylidene}/1{,}000\ C = (N_{vinylidene}/NCH_2)*1{,}000 \quad \text{(Eqn. 9A),}$$

The chemical shift reference was set at 6.0 ppm for the $^1$H signal from residual proton from TCE-d2. The control was run with ZG pulse, NS=4, DS=12, SWH=10,000 Hz, AQ=1.64 s, D1=14 s. The double presaturation experiment was run with a modified pulse sequence, with O1P=1.354 ppm, O2P=0.960 ppm, PL9=57 db, PL21=70 db, NS=100, DS=4, SWH=10,000 Hz, AQ=1.64 s, D1=1 s (where D1 is the presaturation time), D13=13 s. Only the vinyl levels were reported in Table 2 below.

$^{13}$C NMR Method

Samples are prepared by adding approximately 3 g of a 50/50 mixture of tetra-chloroethane-d2/orthodichlorobenzene, containing 0.025 M $Cr(AcAc)_3$, to a "0.25 g polymer sample" in a 10 mm NMR tube. Oxygen is removed from the sample by purging the tube headspace with nitrogen. The samples are then dissolved, and homogenized, by heating the tube and its contents to 150° C., using a heating block and heat gun. Each dissolved sample is visually inspected to ensure homogeneity.

All data are collected using a Bruker 400 MHz spectrometer. The data is acquired using a 6 second pulse repetition delay, 90-degree flip angles, and inverse gated decoupling with a sample temperature of 120° C. All measurements are made on non-spinning samples in locked mode. Samples are allowed to thermally equilibrate for 7 minutes prior to data acquisition. The 13C NMR chemical shifts were internally referenced to the EEE triad at 30.0 ppm.

C13 NMR Comonomer Content: It is well known to use NMR spectroscopic methods for determining polymer composition. ASTM D 5017-96; J. C. Randall et al., in "NMR and Macromolecules" ACS Symposium series 247; J. C. Randall, Ed., Am. Chem. Soc., Washington, D.C., 1984, Ch. 9; and J. C. Randall in "Polymer Sequence Determination", Academic Press, New York (1977) provide general methods of polymer analysis by NMR spectroscopy.

Molecular Weighted Comonomer Distribution Index (MWCDI)

A GPC-IR, high temperature chromatographic system from PolymerChar (Valencia, Spain) was equipped with a Precision Detectors' (Amherst, Mass.) 2-angle laser light scattering detector Model 2040, and an IR5 infra-red detector (GPC-IR) and a 4-capillary viscometer, both from PolymerChar. The "15-degree angle" of the light scattering detector was used for calculation purposes. Data collection was performed using PolymerChar Instrument Control software and data collection interface. The system was equipped with an on-line, solvent degas device and pumping system from Agilent Technologies (Santa Clara, Calif.).

Injection temperature was controlled at 150 degrees Celsius. The columns used, were four, 20-micron "Mixed-A" light scattering columns from Polymer Laboratories (Shropshire, UK). The solvent was 1,2,4-trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently, at 160 degrees Celsius, for three hours. The injection volume was "200 microliters," and the flow rate was "1 milliliters/minute."

Calibration of the GPC column set was performed with 21 "narrow molecular weight distribution" polystyrene standards, with molecular weights ranging from 580 to 8,400,000 g/mole. These standards were arranged in six "cocktail" mixtures, with at least a decade of separation between individual molecular weights. The standards were purchased from Polymer Laboratories (Shropshire UK). The polystyrene standards were prepared at "0.025 grams in 50 milliliters of solvent" for molecular weights equal to, or greater than, 1,000,000 g/mole, and at "0.050 grams in 50 milliliters of solvent" for molecular weights less than 1,000,000 g/mole. The polystyrene standards were dissolved at 80 degrees Celsius, with gentle agitation, for 30 minutes. The narrow standards mixtures were run first, and in order of decreasing "highest molecular weight component," to minimize degradation. The polystyrene standard peak molecular weights were converted to polyethylene molecular weights using Equation 1B (as described in Williams and Ward, J. Polym. Sci., Polym. Let., 6, 621 (1968)):

$$\text{Mpolyethylene}=A\times(\text{Mpolystyrene})^{B} \qquad \text{(Eqn. 1B)},$$

where M is the molecular weight, A has a value of approximately 0.40 and B is equal to 1.0. The A value was adjusted between 0.385 and 0.425 (depending upon specific column-set efficiency), such that NBS 1475A (NIST) linear polyethylene weight-average molecular weight corresponded to 52,000 g/mole, as calculated by Equation 3B, below:

$$Mn(LALS\ gpc)=\frac{\sum_{i=RV_{integration\ start}}^{i=RV_{integration\ end}}(IR_{measurement\ channel_i})}{\sum_{i=RV_{integration\ start}}^{i=RV_{integration\ end}}(IR_{measurement\ channel_i}/M_{PE_i})} \qquad \text{(Eqn. 2B)}$$

$$Mw(LALS\ gpc)=\frac{\sum_{i=RV_{integration\ start}}^{i=RV_{integration\ end}}(M_{PE_i}\ IR_{measurement\ channel_i})}{\sum_{i=RV_{integration\ start}}^{i=RV_{integration\ end}}(IR_{measurement\ channel_i})} \qquad \text{(Eqn. 3B)}$$

In Equations 2B and 3B, RV is column retention volume (linearly-spaced), collected at "1 point per second." The IR is the baseline-subtracted IR detector signal, in Volts, from the measurement channel of the GPC instrument, and the $M_{PE}$ is the polyethylene-equivalent MW determined from Equation 1B. Data calculation were performed using "GPC One software (version 2.013H)" from PolymerChar.

A calibration for the IR5 detector ratios was performed using at least ten ethylene-based polymer standards (polyethylene homopolymer and ethylene/octene copolymers; narrow molecular weight distribution and homogeneous comonomer distribution) of known short chain branching (SCB) frequency (measured by the $^{13}$C NMR Method, as discussed above), ranging from homopolymer (0 SCB/1000 total C) to approximately 50 SCB/1000 total C, where total C=carbons in backbone+carbons in branches. Each standard had a weight-average molecular weight from 36,000 g/mole to 126,000 g/mole, as determined by the GPC-LALS processing method described above. Each standard had a molecular weight distribution (Mw/Mn) from 2.0 to 2.5, as determined by the GPC-LALS processing method described above. Polymer properties for the SCB standards are shown in Table A.

TABLE A

"SCB" Standards

| Wt % Comonomer | IR5 Area ratio | SCB/1000 Total C | Mw | Mw/Mn |
|---|---|---|---|---|
| 23.1 | 0.2411 | 28.9 | 37,300 | 2.22 |
| 14.0 | 0.2152 | 17.5 | 36,000 | 2.19 |
| 0.0 | 0.1809 | 0.0 | 38,400 | 2.20 |
| 35.9 | 0.2708 | 44.9 | 42,200 | 2.18 |
| 5.4 | 0.1959 | 6.8 | 37,400 | 2.16 |
| 8.6 | 0.2043 | 10.8 | 36,800 | 2.20 |
| 39.2 | 0.2770 | 49.0 | 125,600 | 2.22 |
| 1.1 | 0.1810 | 1.4 | 107,000 | 2.09 |
| 14.3 | 0.2161 | 17.9 | 103,600 | 2.20 |
| 9.4 | 0.2031 | 11.8 | 103,200 | 2.26 |

The "IR5 Area Ratio (or "$IR5_{Methyl\ Channel\ Area}/IR5_{Measurement\ Channel\ Area}$")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) was calculated for each of the "SCB" standards. A linear fit of the SCB frequency versus the "IR5 Area Ratio" was constructed in the form of the following Equation 4B:

SCB/1000 total C$=A_0+[A_1\times(IR5_{Methyl\ Channel\ Area}/IR5_{Measurement\ Channel\ Area})]$ (Eqn. 4B), where $A_0$ is the "SCB/1000 total C" intercept at an "IR5 Area Ratio" of zero, and $A_1$ is the slope of the "SCB/1000 total C" versus "IR5 Area Ratio," and represents the increase in the "SCB/1000 total C" as a function of "IR5 Area Ratio."

A series of "linear baseline-subtracted chromatographic heights" for the chromatogram generated by the "IR5 methyl channel sensor" was established as a function of column elution volume, to generate a baseline-corrected chromatogram (methyl channel). A series of "linear baseline-subtracted chromatographic heights" for the chromatogram generated by the "IR5 measurement channel" was established as a function of column elution volume, to generate a base-line-corrected chromatogram (measurement channel).

The "IR5 Height Ratio" of "the baseline-corrected chromatogram (methyl channel)" to "the baseline-corrected chromatogram (measurement channel)" was calculated at each column elution volume index (each equally-spaced index, representing 1 data point per second at 1 ml/min elution) across the sample integration bounds. The "IR5 Height Ratio" was multiplied by the coefficient $A_1$, and the coefficient $A_0$ was added to this result, to produce the predicted SCB frequency of the sample. The result was converted into mole percent comonomer, as follows in Equation 5B:

$$\text{Mole Percent Comonomer}=\{SCB_f/[SCB_f+((1000-SCB_f*\text{Length of comonomer})/2)]\}*100 \quad \text{(Eqn. 5B)},$$

where "$SCB_f$" is the "SCB per 1000 total C", and the "Length of comonomer"=8 for octene, 6 for hexene, and so forth.

Each elution volume index was converted to a molecular weight value ($Mw_i$) using the method of Williams and Ward (described above; Eqn. 1B). The "Mole Percent Comonomer (y axis)" was plotted as a function of Log($Mw_i$), and the slope was calculated between $Mw_i$ of 15,000 and $Mw_i$ of 150,000 g/mole (end group corrections on chain ends were omitted for this calculation). An EXCEL linear regression was used to calculate the slope between, and including, $Mw_i$ from 15,000 to 150,000 g/mole. This slope is defined as the molecular weighted comonomer distribution index (MWCDI=Molecular Weighted Comonomer Distribution Index).

Representative Determination of MWCDI

To illustrate determination of MWCDI, a representative determination of MWCDI is provided for a sample composition. A plot of the measured "SCB per 1000 total C (=$SCB_f$)" versus the observed "IR5 Area Ratio" of the SCB standards was generated (see FIG. 1), and the intercept ($A_0$) and slope ($A_1$) were determined. Here, $A_0$=−90.246 SCB/1000 total C; and $A_1$=499.32 SCB/1000 total C.

Figure 2:
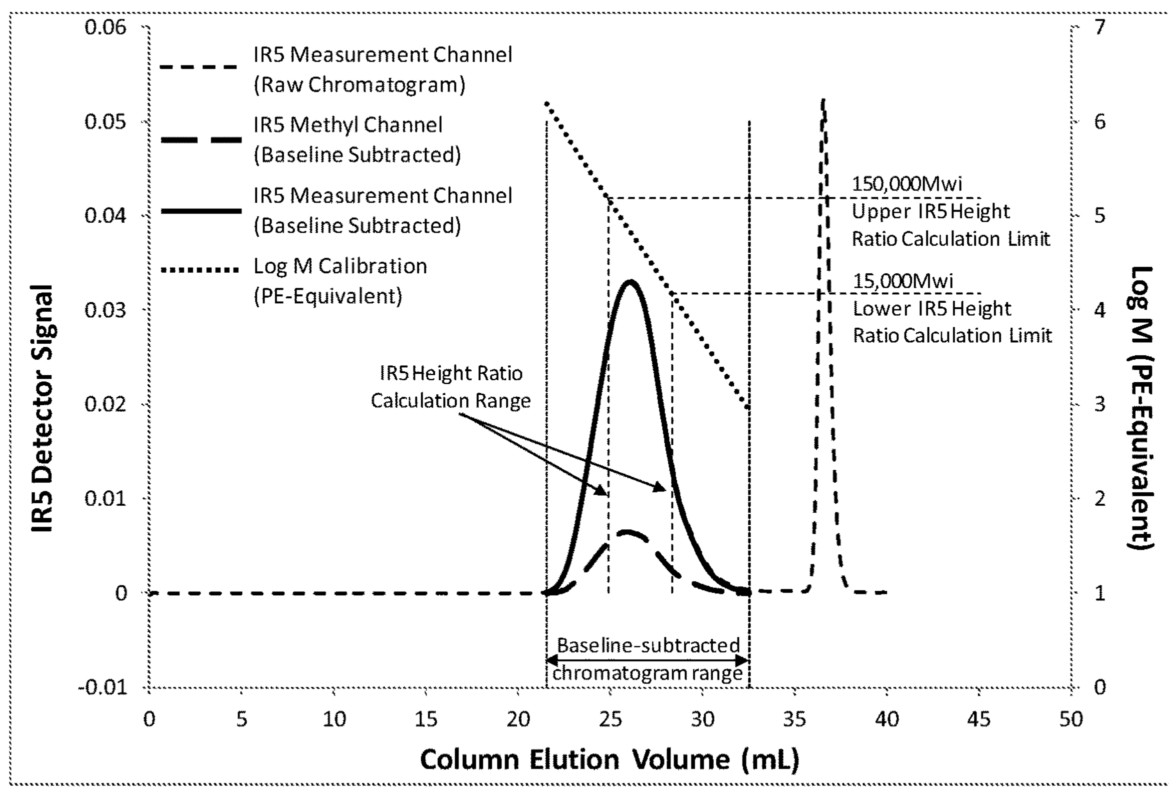
FIG. 2 depicts the several GPC profiles for the determination of IR5 Height Ratio for a sample first composition.
Figure 3:
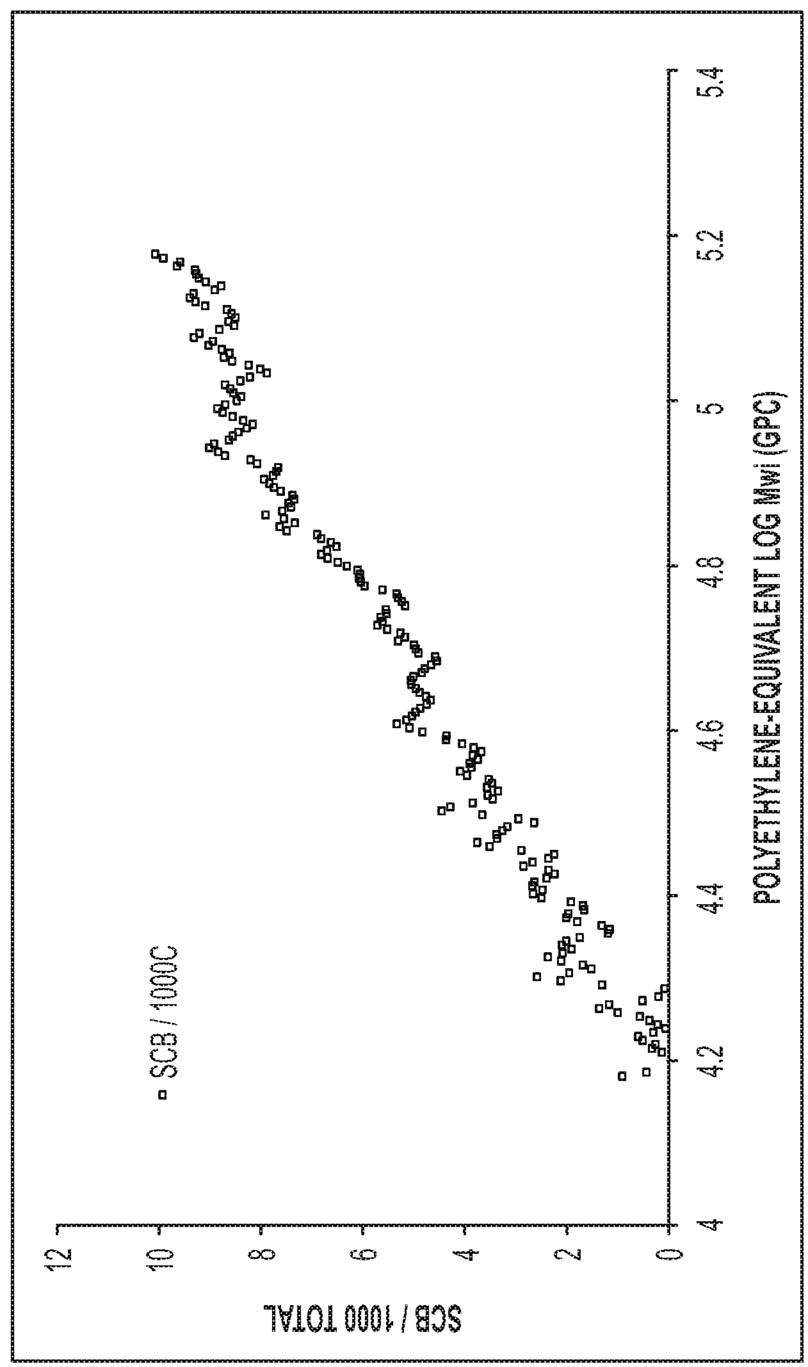
FIG. 3 depicts the plot of "$SCB_f$ versus Polyethylene Equivalent molecular Log $Mw_i$ (GPC)" for a sample first composition.

The "IR5 Height Ratio" was determined for the sample composition (See integration shown in FIG. 2). This height ratio (IR5 Height Ratio of sample composition) was multiplied by the coefficient $A_1$, and the coefficient $A_0$ was added to this result, to produce the predicted SCB frequency of this example, at each elution volume index, as described above ($A_0$=−90.246 SCB/1000 total C; and $A_1$=499.32 SCB/1000 total C). The $SCB_f$ was plotted as a function of polyethylene-equivalent molecular weight, as determined using Equation 1B, as discussed above. See FIG. 3 (Log Mwi used as the x-axis).

Figure 4:
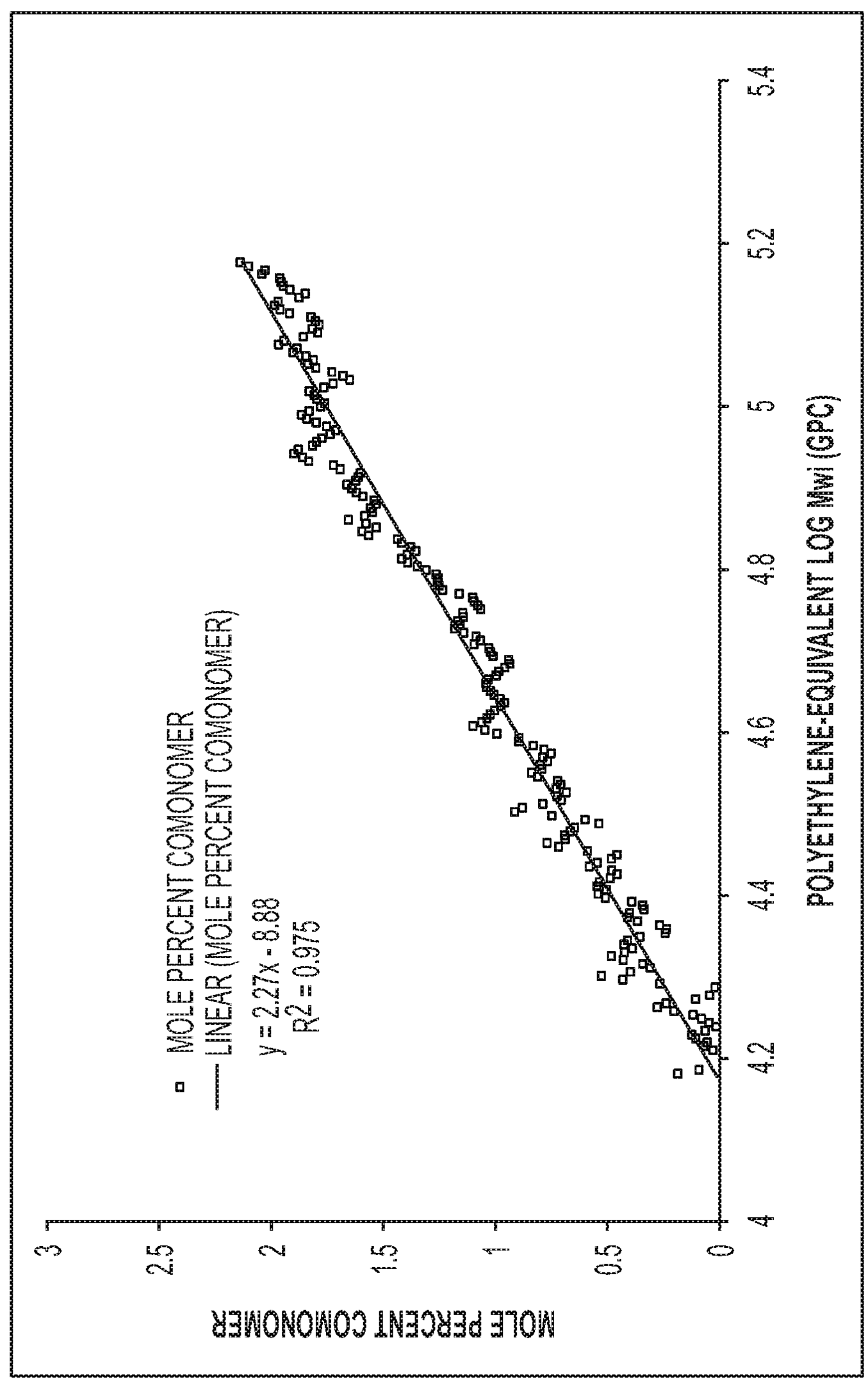
FIG. 4 depicts a plot of the "Mole Percent Comonomer versus Polyethylene Equivalent $\mathrm{Log}_{Mwi}$ (GPC)" for a sample first composition.

The $SCB_f$ was converted into "Mole Percent Comonomer" via Equation 5B. The "Mole Percent Comonomer" was plotted as a function of polyethylene-equivalent molecular weight, as determined using Equation 1B, as discussed above. See FIG. 4 (Log Mwi used as the x-axis). A linear fit was from Mwi of 15,000 g/mole to Mwi of 150,000 g/mole, yielding a slope of "2.27 mole percent comonomer×mole/g." Thus, the MWCDI=2.27. An EXCEL linear regression was used to calculate the slope between, and including, Mwi from 15,000 to 150,000 g/mole.

Dart Drop Impact Test

Falling dart impact strengths were evaluated using an impact tester with fixed weights according to the ASTM D-1709 method A. The drop dart impact test is used in determining impact strength. A weighted round-headed dart is dropped onto a tightly clamped sheet of film, and the sample is examined for failures (tears or holes in the film). Enough drops of varying weights are made to determine the weight in grams for a 50 percent failure point. Test method A specifies a dart with a 38 mm (1.5") diameter dropped from 0.66 m (26").

Secant Modulus

Secant modulus at 2% strain are measured in the machine direction (MD) and cross direction (CD) with an Instron Universal tester according to ASTM D882.

Haze

Haze was measured in accordance with ASTM D1003 using BYK Gardner Haze-gard.

Gloss

Gloss was measured in accordance with ASTM D2457 using a BYK Gardner Glossmeter Microgloss 45°.

Elmendorf Tear Resistance

Elmendorf Tear Resistance is measured in machine direction (MD) and transverse direction (TD) in accordance with ASTM D1922.

Puncture Strength

Puncture strength is measured on a ZWICK model Z010 with TestXpertll software. The specimen size is 6"×6" and at least 5 measurements are made to determine an average puncture value. A 1000 Newton load cell is used with a round specimen holder. The specimen is a 4 inch diameter circular specimen. The Puncture strength procedures follow ASTM D5748-95 standard, with modification to the probe described here. The puncture probe is a ½ inch diameter ball shaped polished stainless steel probe. There is no gauge length; the probe is as close as possible to, but not touching, the specimen. The probe is set by raising the probe until it touched the specimen. Then the probe is gradually lowered, until it is not touching the specimen. Then the crosshead is set at zero. Considering the maximum travel distance, the distance would be approximately 0.10 inch. The crosshead speed used is 250 mm/minute. The thickness is measured in the middle of the specimen. The thickness of the film, the distance the crosshead traveled, and the peak load are used to determine the puncture by the software. The puncture probe is cleaned after each specimen. The puncture strength is the maximum peak load at break (in ft*$lb_f/in^3$).

Examples

The following examples illustrate features of the present disclosure but are not intended to limit the scope of the disclosure.

Polymer Resins Used in Example Laminates and Films

The following resins listed in Table 1 were used in the following multilayer polyolefin film and laminate examples.

TABLE 1

| Resin | Density (g/cc) | Melt Index ($I_2$) (g/10 min) | Slip Additive and/or Antiblock Additive | Supplier |
|---|---|---|---|---|
| First Composition 1 | 0.9174 | 0.83 | No antiblock or slip additive | The Dow Chemical Company (Midland, MI) |
| ELITE ™ 5400G (LLDPE) | 0.916 | 1.00 | No antiblock or slip additive | The Dow Chemical Company (Midland, MI) |
| ELITE ™ 5401G | 0.918 | 1.00 | 2500 ppm of antiblock additive 1000 ppm of slip additive | The Dow Chemical Company (Midland, MI) |
| ELITE ™ 5960G (HDPE) | 0.962 | 0.85 | 3000 ppm of antiblock additive | The Dow Chemical Company (Midland, MI) |
| AFFINITY ™ PF 1146G (LLDPE) | 0.890 | 1.00 | 6000 ppm of antiblock additive 3500 ppm of slip additive | The Dow Chemical Company (Midland, MI) |
| AGILITY ™ 1021 (LDPE) | 0.920 | 1.85 | No antiblock or slip additive | The Dow Chemical Company (Midland, MI) |
| DOWLEX ™ 5075G (LLDPE) | 0.917 | 1.3 | No antiblock or slip additive | The Dow Chemical Company (Midland, MI) |
| AFFINITY ™ PL 1881G (Polyolefin Plastomer) | 0.904 | 1.0 | 2500 ppm of antiblock additive 750 ppm of slip additive | The Dow Chemical Company (Midland, MI) |

Additional Additives

Ampacet 10063 is an antiblock additive masterbatch containing 20% antiblock with the primary component being a polyethylene having a melt index ($I_2$) of 8.0 g/10 minutes and is commercially available from Ampacet. Ampacet 10090 is a slip additive masterbatch containing 5% slip with the primary component being a polyethylene having a melt index ($I_2$) of 8.0 g/10 minutes and is commercially available from Ampacet.

First Composition 1

First Composition 1, which comprises at least one ethylene-based polymer, has a MWCDI value greater than 0.9, and a melt index ratio ($I_{10}/I_2$) that meets the following equation: $I10/I2 \geq 7.0 - 1.2 \times \log(I_2)$. First Composition 1 contains two ethylene-octene copolymers. Each composition was prepared, via solution polymerization, in a dual series loop reactor system according to U.S. Pat. No. 5,977,251 (see FIG. 2 of this patent), in the presence of a first catalyst system, as described below, in the first reactor, and a second catalyst system, as described below, in the second reactor.

The first catalyst system comprised a bis((2-oxoyl-3-(dibenzo-1H-pyrrole-1-yl)-5-(methyl)phenyl)-2-phenoxymethyl)-methylene-1,2-cyclohexanediylhafnium (IV) dimethyl, represented by the following formula (CAT 1):

(CAT 1)

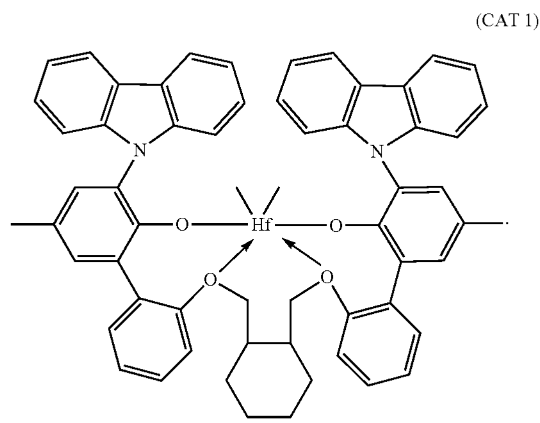

The molar ratios of the metal of CAT 1, added to the polymerization reactor, in-situ, to that of Cocat1 (bis(hydrogenated tallow alkyl)methyl,tetrakis(pentafluorophenyl)borate(1-) amine), or Cocat2 (modified methyl aluminoxane (MMAO)), are shown in Table 2.

The second catalyst system comprised a Ziegler-Natta type catalyst (CAT 2). The heterogeneous Ziegler-Natta type catalyst-premix was prepared substantially according to U.S. Pat. No. 4,612,300, by sequentially adding to a volume of ISOPAR E, a slurry of anhydrous magnesium chloride in ISOPAR E, a solution of $EtAlCl_2$ in heptane, and a solution of $Ti(O\text{-}iPr)_4$ in heptane, to yield a composition containing a magnesium concentration of 0.20M, and a ratio of Mg/Al/

Ti of 40/12.5/3. An aliquot of this composition was further diluted with ISOPAR-E to yield a final concentration of 500 ppm Ti in the slurry. While being fed to, and prior to entry into, the polymerization reactor, the catalyst premix was contacted with a dilute solution of $Et_3A1$, in the molar Al to Ti ratio specified in Table 2, to give the active catalyst.

The polymerization conditions for First Composition 1 is reported in Table 2. As seen in Table 2, Cocat. 1 (bis(hydrogenated tallow alkyl)methyl,tetrakis(pentafluorophenyl)borate(1-) amine); and Cocat. 2 (modified methyl aluminoxane (MMAO)) were each used as a cocatalyst for CAT 1. Additional properties of First Composition 1 is measured and reported in Table 3. Each polymer composition was stabilized with minor (ppm) amounts of stabilizers.

TABLE 2

Polymerization Conditions (R × 1 = reactor 1; R × 2 = reactor 2)

| Sample | Units | First Composition 1 |
|---|---|---|
| Reactor Configuration | Type | Dual Series |
| Comonomer type | Type | 1-octene |
| First Reactor Feed Solvent/ Ethylene Mass Flow Ratio | g/g | 5.5 |
| First Reactor Feed Comonomer/ Ethylene Mass Flow Ratio | g/g | 0.39 |
| First Reactor Feed Hydrogen/ Ethylene Mass Flow Ratio | g/g | 3.8E−04 |
| First Reactor Temperature | ° C. | 140 |
| First Reactor Pressure | barg | 50 |
| First Reactor Ethylene Conversion | % | 86.7 |
| First Reactor Catalyst Type | Type | CAT 1 |
| First Reactor Co-Catalyst1 Type | Type | Cocat. 1 |
| First Reactor Co-Catalyst2 Type | Type | Cocat .2 |
| First Reactor Co-Catalyst1 to Catalyst Molar Ratio (B to Hf ratio) | Ratio | 1.3 |
| First Reactor Co-Catalyst2 Scavenger Molar Ratio (Al to Hf ratio) | Ratio | 20.2 |
| First Reactor Residence Time | min | 9.0 |
| Second Reactor Feed Solvent/ Ethylene Mass Flow Ratio | g/g | 2.1 |
| Second Reactor Feed Comonomer/ Ethylene Mass Flow Ratio | g/g | 0.067 |
| Second Reactor Feed Hydrogen/ Ethylene Mass Flow Ratio | g/g | 1.9E−05 |
| Second Reactor Temperature | ° C. | 195 |
| Second Reactor Pressure | Barg | 50 |
| Second Reactor Ethylene Conversion | % | 87.1 |
| Second Reactor Catalyst Type | Type | CAT 2 |
| Second Reactor Co-Catalyst Type | Type | $Et_3Al$ |
| Second Reactor Co-Catalyst to Catalyst Molar Ratio (Al to Ti ratio) | Ratio | 4.0 |
| Second Reactor Residence Time | Min | 6.5 |

*solvent = ISOPAR E

TABLE 3

Properties of First Composition 1

| Property | Unit | First Composition 1 |
|---|---|---|
| Density | g/cc | 0.9174 |
| $I_2$ | g/10 min | 0.83 |
| $I_{10}/I_2$ | | 7.7 |
| 7.0 − 1.2 × log(I2) | | 7.1 |
| Mn (conv.gpc) | g/mol | 32,973 |
| Mw (conv.gpc) | | 117,553 |
| Mz (conv.gpc) | | 270,191 |
| Mw/Mn (conv.gpc) | | 3.57 |
| Mz/Mw (conv.gpc) | | 2.30 |
| Eta* (0.1 rad/s) | Pa · s | 9,496 |
| Eta* (1.0 rad/s) | Pa · s | 7,693 |
| Eta* (10 rad/s) | Pa · s | 4,706 |
| Eta* (100 rad/s) | Pa · s | 1,778 |
| Eta*0.1/Eta*100 | | 5.34 |
| Eta zero | Pa · s | 11,210 |
| MWCDI | | 2.64 |
| Vinyls | Per 1000 total Carbons | 134 |
| ZSVR | | 1.53 |

Multilayer Film Example

In the Example below, multilayer films were fabricated using a 7-layer Alpine blown film line. The Alpine blown film line were configured as shown in Table 4 to prepare the multilayer films:

TABLE 4

| | |
|---|---|
| Blow-up Ratio | 2.5 |
| Output rate (lbs/ inch of circ. of die) | 11.3 |
| Air ring blower % supply | 25 |
| Air ring coil temperature (° F.) | 63 |
| Die size (mm) | 250 |
| Die temperature (° F.) | 450 |
| Die gap (inch) | 2.0 |
| Draw down ratio | 7.0 |
| Frostline height (inch) | 34 |
| IBC coil temperature (° F.) | 49.7 |
| IBC exhaust | 58 |
| IBC supply | 50 |
| Melt T (° F.) for resins | 440-475 |

In this Example, a multilayer film (Inventive Film 1) incorporating the First Composition 1 was compared to a Comparative Film (Comparative Film A). As shown in Table 5, each of the films had an overall thickness of 4.5 mil and had the following structure (D/C/B/B/B/B/A) (the inner "B" layers form a single layer even though it is a 7-layer coextrusion). This film structure is schematically illustrated in FIG. 5.

TABLE 5

| | Inventive Film 1 | Comparative Film A |
|---|---|---|
| Layer Structure (thickness) | D/C/B/B/B/A (4.5 mil) | D/C/B/B/B/A (4.5 mil) |
| Layer D (0.675 mil thickness) | 82% First Composition 1<br>15% AGILITY ™ 1021<br>1% Ampacet 10063<br>2% Ampacet 10090 | 82% ELITE ™ 5400G<br>15% AGILITY ™ 1021<br>1% Ampacet 10063<br>2% Ampacet 10090 |
| Layer C (0.63 mil) | ELITE ™ 5960G | ELITE ™ 5960G |
| Layer B (2.565 mil)* | 85% % First Composition 1<br>15% AGILITY ™ 1021 | 85% % ELITE ™ 5400G<br>15% AGILITY ™ 1021 |
| Layer A (0.63 mil) (Sealant Layer) | 95% AFFINITY ™ PF 1146G<br>1% Ampacet 10063<br>4% Ampacet 10090 | 95% AFFINITY ™ PF 1146G<br>1% Ampacet 10063<br>4% Ampacet 10090 |

*B has 3 layers with 0.63 mils thickness and 1 layer with 0.675 mil thickness

The properties measured for Inventive Film 1 and Comparative Film A are provided in Table 6 below.

TABLE 6

| Property | Units | Inventive Film 1 | Comparative Film A |
|---|---|---|---|
| Dart Impact (Method-A) | g | 670 | 460 |
| Secant Modulus - MD at 2% strain | psi | 77220 | 73850 |
| Secant Modulus - CD at 2% strain | psi | 73530 | 68670 |
| Elmendorf tear strength (MD) | g | 400 | 390 |
| Elmendorf tear strength (CD) | g | 1170 | 1190 |
| Puncture Strength | $ft*lb_f/in^3$ | 40 | 30 |
| Gloss - 45 degree | % | 49 | 49 |
| Haze - total | % | 36 | 37 |

This data in Table 6 demonstrates that the toughness of a multilayer film (Inventive Film 1), as determined by dart impact values, was improved using First Composition 1. Other properties such as tear and puncture strength were not compromised by the improvement in dart impact. Furthermore, the improvement in dart impact (~45%) in Inventive Film 1 relative to Comparative Film A was not realized by reducing density which is a common approach for increasing toughness. By not reducing density, the stiffness (e.g., secant modulus) of Inventive Film 1 was not compromised. Moreover, by increasing density, the stiffness (e.g. secant modulus) was increased while simultaneously delivering improved toughness. Thus, Inventive Film 1 provided the unexpected benefit of improving toughness of a multilayer film while also improving stiffness, while not compromising other physical properties.

Laminate Examples

Additionally, experimental laminates were produced to show the impact of the First Composition 1 on the sealant film and the laminate. The compositional details of Inventive Laminate 1 and Comparative Laminates A and B are provided in Table 7 below. Corona treatment was performed on layer C of the Sealant Film and layer D of the Print Film.

TABLE 7

| | Inventive Laminate 1 | Comparative Laminate A | Comparative Laminate B |
|---|---|---|---|
| Layer Structure (thickness) | | F/E/D/Ink/Adhesive/C/B/A | |
| Thickness of Blown Print Film | 45 μm (15% F/65% E/20% D) | 43 μm (20% F/60% E/20% D) | 45 μm (15% F/65% E/20% D) |
| Layer F | 96.75% DOWLEX ™ 5075G<br>2% Ampacet 10090<br>1.25% Ampacet 1063 | 96.75% DOWLEX ™ 5075G<br>2% Ampacet 10090<br>1.25% Ampacet 1063 | 96.75% DOWLEX ™ 5075G<br>2% Ampacet 10090<br>1.25% Ampacet 1063 |
| Layer E | 98% ELITE ™ 5960G<br>2% Ampacet 10090 | 98% ELITE ™ 5960G<br>2% Ampacet 10090 | 98% ELITE ™ 5960G<br>2% Ampacet 10090 |
| Layer D | 98% First Composition 1<br>2% Ampacet 10090 | 99% ELITE ™ 5401G<br>1% Ampacet 10090 | 99% ELITE ™ 5401G<br>1% Ampacet 10090 |
| Thickness of Blown Sealant Film | 80 μm (20% C/60% B/20% A) | 43 μm (20% C/60% B/20% A) | 80 μm (20% C/60% B/20% A) |
| Layer C | 40% ELITE ™ 5960G<br>59% First Composition 1<br>1% Ampacet 10090 | 99% ELITE ™ 5960G<br>1% Ampacet 10090 | 40% ELITE ™ 5960G<br>59% ELITE ™ 5401G<br>1% Ampacet 10090 |
| Layer B | 87.5% ELITE ™ 5960G<br>10% $TiO_2$<br>2.5% Ampacet 10090 | 87.5% ELITE ™ 5960G<br>10% $TiO_2$<br>2.5% Ampacet 10090 | 87.5% ELITE ™ 5960G<br>10% $TiO_2$<br>2.5% Ampacet 10090 |
| Layer A | 53.5% AFFINITY 1881 G<br>40% First Composition 1<br>4% Ampacet 10090<br>2.5% Ampacet 1063 | 91% AFFINITY 1881 G<br>4% Ampacet 10090<br>5% Ampacet 1063 | 53.5% AFFINITY 1881 G<br>40% ELITE ™ 5401G<br>4% Ampacet 10090<br>2.5% Ampacet 1063 |

The blown film extrusion processes used to make the blown sealant films and blown print films of Table 7 were conducted on a 7-layer Alpine blown film line. The Alpine blown film line were configured as shown in Table 4 to prepare the multilayer films:

Lamination Process

After flexographic 8-color printing on a Comexi printing machine at a speed of 250 meters/min, the reverse printed print film and the sealant film were laminated using a polyurethane bicomponent solventless adhesive available from COIM GROUP. Lamination was done on an SL laminator from Nordmecanica SpA at a running speed of 300 meters/min.

Fabrication of Stand Up Pouch

The forming speed varies according to the SUP size, features (zipper or spout) and structure of the film or laminate. The conditions used in the Laminate Example are provided in Table 8 as follows:

| Structure/Size (Longitudinal seals and horizontal zipper) - K style, bottom gusset | Seal Temperature Range (° C) | Dwell Time | Forming speed (pouch per minute) |
|---|---|---|---|
| PET//PE - large standup pouch 13-16 inch wide × 17-23 inch height | 180-200 | 0.5-1.5 | 28 |
| PET//PE - small standup pouch 5-9 inch wide × 9-14 inches height | 180-200 | 0.5-1.0 | 70 |
| PE//PE - large standup pouch 13-16 inch wide × 17-23 inch height | 120-130 | 0.5-1.5 | Varies depending on the formulation (See Table 9) |
| PE//PE - small standup pouch 5-9 inch wide × 9-14 inches height | 120-130 | 0.5-1.0 | Varies depending on the formulation (See Table 9) |

Experimental Results

In Comparative Laminate A, using 100% AFFINITY PL1881 G in the seal layer led to increased blocking during coextrusion which was partially solved using excessive amounts of antiblock agents but still, a reduction in the extrusion speed was necessary. The appearance of the package in the sealed area was also compromised during the pouch making process, because of the lower thermal resistance of AFFINITY PL1881 G. Excessive curling was also noted due to the modulus difference between AFFINITY (density of 0.902 g/cc) in the seal layer and ELITE 5960G (density of 0.962 g/cc) in the other surface film layer. The curling adversely affected the lamination process.

In an attempt to improve processing of the sealant film, Comparative Laminate B was produced having a seal layer comprising a 40/60% by wt. blend of ELITE™ 5401G and AFFINITY™ PL 1881G. This change slightly reduced blocking and curling, but did not have a positive impact in the pouch formability and the appearance of the package.

The introduction of First Composition 1 in Inventive Example 1 solved the above stated problems and improved the toughness properties, which are useful especially for standup pouches. As shown in Table 9 below, the inclusion of First Composition 1 achieved a significant improvement in the number of large and small standup pouches produced from Inventive Laminate 1 relative to pouches produced from Comparative Laminate B, because the First Composition 1 improved the thermal resistance and the strength (e.g., increased stiffness and decreased elongation) of the sealant film and the laminate. Consequently, pouch forming speeds could be increased for the Inventive Laminate 1 to levels comparable to PET//PE standup pouches (See table 8), whereas inferior thermal resistance and strength necessitated lower pouch forming speeds for Comparative Laminate B.

TABLE 9

| Experimental Results | | |
|---|---|---|
| | Inventive Laminate 1 | Comparative Laminate B |
| Large Standup Pouches Produced Per Minute | 25 | 15 |
| Small Standup Pouches Produced Per Minute | 60 | 45 |
| Large Standup Pouch Seal Strength** | 8 kgf/inch | 6 kgf/inch |

**Large Standup Pouch is holding 14 kg of food product

In addition to the advantages in standup pouch formability, there were also advantages to the film extrusion and conversion process. Inventive Laminate 1, which included first composition 1, had lower elongation and higher stiffness, thereby resulting in the following improvements: 1) Extrusion: minimized blocking in both the print film and sealant film; 2) Printing: better registration due to minimum elongation; 3) Lamination: better processing due to higher stiffness and minimized elongation.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

It will be apparent in combination with the claims and drawings that use of the singular also includes the possibility of the plural. For example, reference to an oil barrier layer also implicitly includes reference to at least one oil barrier layer.

The invention claimed is:

1. A multilayer polyolefin film comprising at least 3 layers, the multilayer polyolefin film comprising:

a first surface layer comprising:

a first composition comprising at least one ethylene/α-olefin copolymer, wherein the first composition comprises a Molecular Weighted Comonomer Distribution Index (MWCDI) value greater than 0.9, and a melt index ratio ($I_{10}/I_2$) that meets the following equation: $I_{10}/I_2 \geq 7.0-1.2\times\log(I_2)$; and a second composition comprising an ethylene/α-olefin copolymer having a density from 0.890 to 0.925 g/cc and a melt index (I2) from 0.2 to 2.0 g/10 min;

a first intermediate layer comprising the first composition; and a second intermediate layer, wherein at least one of the first intermediate layer and the second intermediate layer comprises a high density polyethylene (HDPE) having a density from 0.950 to 0.965 g/cc and a melt index (I2) from 0.1 to 1.3 g/10 min.

2. The multilayer polyolefin film of claim 1, wherein the first intermediate layer further comprises from 40 to 80 wt % of the first composition, and from 20 to 60 wt % of the HDPE.

3. The multilayer polyolefin film of claim 1, wherein the second composition comprises linear low density polyethylene (LLDPE).

4. The multilayer polyolefin film of claim 1, wherein the second composition comprises a polyolefin plastomer having a density from 0.890 to 0.910 g/cc.

5. The multilayer polyolefin film of claim 1, wherein the first surface layer comprises antiblock agents, slip agents, or both.

6. The multilayer polyolefin film of claim 1, wherein the first surface layer comprises from 30 to 90 wt % of the first composition, and from 10 to 70 wt % of the second composition.

7. The multilayer polyolefin film of claim 1, wherein the first composition has a density from 0.910 to 0.926 g/cc.

8. A laminate structure comprising:

the multilayer polyolefin film of claim 1; and a second multilayer polyolefin film laminated to the multilayer polyolefin film.

9. The laminate structure of claim 8, wherein the second multilayer polyolefin film comprises high density polyethylene (HDPE) having a density from 0.950 to 0.965 g/cc and a melt index (12) from 0.1 to 1.3 g/10 min.

10. The laminate structure of claim 8, wherein the second multilayer polyolefin film comprises the first composition.

11. The laminate structure of claim 8, wherein the multilayer polyolefin film is a sealant film and the second multilayer polyolefin film is a print film, and wherein the first surface layer is a sealant layer.

12. The laminate structure of claim 8, wherein the laminate is a monomaterial polyethylene laminate.

13. An article comprising the laminate structure of claim 8, wherein the article is a flexible packaging material.

14. The article of claim 13, wherein the flexible packaging material is a standup pouch.

* * * * *